(12) United States Patent
Araki

(10) Patent No.: US 11,082,461 B2
(45) Date of Patent: Aug. 3, 2021

(54) INFORMATION PROCESSING APPARATUS, INFORMATION PROCESSING SYSTEM, AND INFORMATION PROCESSING METHOD

(71) Applicant: Shigeo Araki, Kanagawa (JP)

(72) Inventor: Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/909,166

(22) Filed: Jun. 23, 2020

(65) Prior Publication Data

US 2020/0412777 A1    Dec. 31, 2020

(30) Foreign Application Priority Data

Jun. 25, 2019 (JP) .............................. JP2019-117791
Apr. 27, 2020 (JP) .............................. JP2020-078495

(51) Int. Cl.
*G06F 3/0482* (2013.01)
*H04L 29/06* (2006.01)
*H04L 12/58* (2006.01)

(52) U.S. Cl.
CPC ........ *H04L 65/4015* (2013.01); *G06F 3/0482* (2013.01); *H04L 51/22* (2013.01); *H04L 65/1083* (2013.01)

(58) Field of Classification Search
CPC .................................................... G06F 3/0482
See application file for complete search history.

(56) References Cited

U.S. PATENT DOCUMENTS

| | | | |
|---|---|---|---|
| 2004/0128354 A1 | 7/2004 | Horikiri et al. | |
| 2013/0132480 A1* | 5/2013 | Tsuji .................. | G06Q 10/06 709/204 |
| 2016/0210602 A1* | 7/2016 | Siddique .............. | G06Q 20/407 |
| 2016/0379171 A1* | 12/2016 | Gatzke ................. | G06Q 10/109 705/7.19 |
| 2017/0061389 A1* | 3/2017 | Naughton .......... | G06Q 10/1095 |
| 2018/0063044 A1* | 3/2018 | Mikhailov ........... | H04L 67/306 |
| 2018/0067700 A1 | 3/2018 | Araki | |
| 2018/0121828 A1* | 5/2018 | Keysers ................ | G06N 20/00 |
| 2018/0374028 A1* | 12/2018 | Johansen ............... | G06Q 50/10 |
| 2019/0020770 A1 | 1/2019 | Araki | |
| 2019/0108493 A1 | 4/2019 | Nelson et al. | |
| 2019/0129669 A1 | 5/2019 | Takahashi et al. | |
| 2019/0146745 A1 | 5/2019 | Kato | |
| 2019/0235735 A1 | 8/2019 | Toyota et al. | |
| 2019/0384536 A1 | 12/2019 | Araki | |
| 2020/0374146 A1* | 11/2020 | Chhabra ............... | G06Q 10/101 |

FOREIGN PATENT DOCUMENTS

JP         2010-072784         4/2010

OTHER PUBLICATIONS

Extended European Search Report for EP20180142.0 dated Aug. 17, 2020.

* cited by examiner

*Primary Examiner* — David E Choi
(74) *Attorney, Agent, or Firm* — IPUSA, PLLC

(57) ABSTRACT

An information processing apparatus, an information processing system, and an information processing method. The information processing apparatus manages a detected user as a participant, accepts selection of a shared site from the detected user, and suggests one or more candidates of participant to be managed based on the selected shared site.

11 Claims, 22 Drawing Sheets

FIG. 5

| USER ID | NAME | EMAIL ADDRESS |
|---|---|---|
| office1 | Mary | office1@office.example.com |
| office2 | Sato | office2@office.example.com |
| office3 | Saito | office3@office.example.com |
| office4 | Itoh | office4@office.example.com |
| office5 | Suzuki | office5@office.example.com |
| office6 | Kudoh | office6@office.example.com |
| ... | ... | ... |

FIG. 6

| USER ID | NAME | EMAIL ADDRESS | EXTERNAL SERVICE SETTING ID | IDENTIFICATION INFORMATION |
|---|---|---|---|---|
| user001 | Mary Smith | mary@intra.example.com | connect1a | ICCARD-123 |
| user002 | Sato Ayumu | sato@intra.example.com | connect2a | ICCARD-248 |
| user003 | Saito Ichiro | saito@intra.example.com | connect3a | ICCARD-255 |
| user004 | Itoh Ichiro | itoh@intra.example.com | connect4a | ICCARD-260 |
| user005 | Suzuki Kei | suzuki@intra.example.com | connect5a | ICCARD-279 |
| user006 | Kudoh Shin | kudoh@intra.example.com | connect6a | ICCARD-281 |
| ... | ... | ... | ... | ... |

FIG. 7

| EXTERNAL SERVICE SETTING ID | USER ID | ADDRESS INFORMATION | EXTERNAL SERVICE USER ID | EXTERNAL SERVICE AUTHENTICATION TOKEN |
|---|---|---|---|---|
| connect1a | user001 | office.example.com | office1 | eyJhbGc11… |
| connect2a | user002 | office.example.com | office2 | eyJhbGc12… |
| connect3a | user003 | office.example.com | office3 | eyJhbGc13… |
| connect4a | user004 | office.example.com | office4 | eyJhbGc14… |
| connect5a | user005 | office.example.com | office5 | eyJhbGc15… |
| connect6a | user006 | office.example.com | office6 | eyJhbGc16… |
| … | … | … | … | … |

FIG. 8

| USER ID | ORGANIZER | EXTERNAL SERVICE SETTINGS INFORMATION | EMAIL ADDRESS |
|---|---|---|---|
| user001 | Yes | EXTERNAL SERVICE SETTINGS INFORMATION (connect1a) | office1@office.example.com |
| user002 | No | EXTERNAL SERVICE SETTINGS INFORMATION (connect2a) | office2@office.example.com |
| user004 | No | EXTERNAL SERVICE SETTINGS INFORMATION (connect4a) | office4@office.example.com |

FIG. 9

| DEVICE ID | DATE AND TIME | EVENT |
|---|---|---|
| K100029 | NOVEMBER 10, 2018 10:01 | Start meeting |
| | NOVEMBER 10, 2018 10:01 | Add user user001 |
| | NOVEMBER 10, 2018 10:02 | Add user user004 |
| | NOVEMBER 10, 2018 10:03 | Add user user005 |
| | NOVEMBER 10, 2018 10:04 | Add user user006 |
| | NOVEMBER 10, 2018 10:05 | Select site Abc Project |
| | NOVEMBER 10, 2018 10:50 | End meeting |
| | NOVEMBER 10, 2018 12:01 | Start meeting |
| | NOVEMBER 10, 2018 12:01 | Add user user001 |
| | NOVEMBER 10, 2018 12:02 | Add user user002 |
| | NOVEMBER 10, 2018 12:02 | Add user user003 |
| | NOVEMBER 10, 2018 12:05 | Select site Abc Tech |
| | NOVEMBER 10, 2018 12:50 | End meeting |
| K100055 | ... | ... |
| ... | ... | ... |

FIG. 10

| DEVICE ID | DATE AND TIME | EVENT |
|---|---|---|
| K100029 | NOVEMBER 10, 2018 10:01 | Start meeting |
| | NOVEMBER 10, 2018 10:01 | Add user user001 |
| | NOVEMBER 10, 2018 10:02 | Add user user004 |
| | NOVEMBER 10, 2018 10:03 | Add user user005 |
| | NOVEMBER 10, 2018 10:04 | Add user user006 |
| | NOVEMBER 10, 2018 10:05 | Select site Abc Project |
| | NOVEMBER 10, 2018 10:50 | End meeting |
| | NOVEMBER 10, 2018 12:01 | Start meeting |
| | NOVEMBER 10, 2018 12:01 | Add user user001 |
| | NOVEMBER 10, 2018 12:02 | Add user user002 |
| | NOVEMBER 10, 2018 12:02 | Add user user003 |
| | NOVEMBER 10, 2018 12:05 | Select site Abc Tech |
| | NOVEMBER 10, 2018 12:50 | End meeting |
| | NOVEMBER 12, 2018 13:01 | Start meeting |
| | NOVEMBER 12, 2018 13:01 | Add user user001 |
| | NOVEMBER 12, 2018 13:02 | Add user user002 |
| | NOVEMBER 12, 2018 13:03 | Add user user004 |
| | NOVEMBER 12, 2018 13:05 | Select site Abc Project |
| | NOVEMBER 12, 2018 13:06 | Add user user006 |
| | NOVEMBER 12, 2018 14:10 | End meeting |
| K100055 | ... | ... |
| ... | ... | ... |

FIG. 11

| SHARED SITE NAME | USER ID |
|---|---|
| Abc Project | user001 |
| | user004 |
| | user005 |
| | user006 |
| Abc Tech | user001 |
| | user002 |
| | user003 |
| ... | ... |

FIG. 12

```
{
  site_name:[
      "Abc Project"
      "Abc Tech"
  ]
}
```

FIG. 13

```
{
 "Abc Project":[
 "user001",
 "user004",
 "user005",
 "user006"
 ],
 "Abc Tech":[
 "user001",
 "user002",
 "user003"
 ]
}
```

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Applications No. 2019-117791, filed on Jun. 25, 2019, and No. 2020-078495 filed on Apr. 27, 2020 in the Japan Patent Office, the entire disclosure of which is hereby incorporated by reference herein.

BACKGROUND

Technical Field

The present disclosure relates to an information processing apparatus, an information processing system, and an information processing method.

Background Art

Conventionally, there has been a server for assisting users in efficiently sharing information created by a collaborative work such as a meeting among interested parties. The server that assists collaborative work extracts candidates of collaborative work space in which a legitimate user who has performed login process (a login user) and other users who are in the same location as the login user are related.

With the spread use of cloud computing in recent years, a shared site such as SharePoint (registered trademark) that is shared by a plurality of users to improve efficiency of group work became available. Further, by distributing a uniform resource locator (URL) of a file stored at the shared site to a plurality of users by email, the plurality of users can easily view the file later. Since a shared site is created specific to a particular purpose, files created for the same purpose can easily be shared by multiple users by saving the files on the same shared site.

SUMMARY

Embodiments of the present disclosure describe an information processing apparatus, an information processing system, and an information processing method. The information processing apparatus manages a detected user as a participant, accepts selection of a shared site from the detected user, and suggests one or more candidates of participant to be managed based on the selected shared site.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is a diagram illustrating an example of account information;

FIG. 6 is a diagram illustrating an example of user information;

FIG. 7 is a diagram illustrating an example of external service settings information.

FIG. 8 is a diagram illustrating an example of participant management information;

FIG. 9 is a diagram illustrating an example of electronic whiteboard usage information;

FIG. 10 is a diagram illustrating another example of electronic whiteboard usage information;

FIG. 11 is a diagram illustrating an example of shared site information;

FIG. 12 is a diagram illustrating an example of a shared site name list transmitted to a shared site information management unit;

FIG. 13 is a diagram illustrating an example of a user list of each shared site returned by the shared site information management unit;

Figure 1:
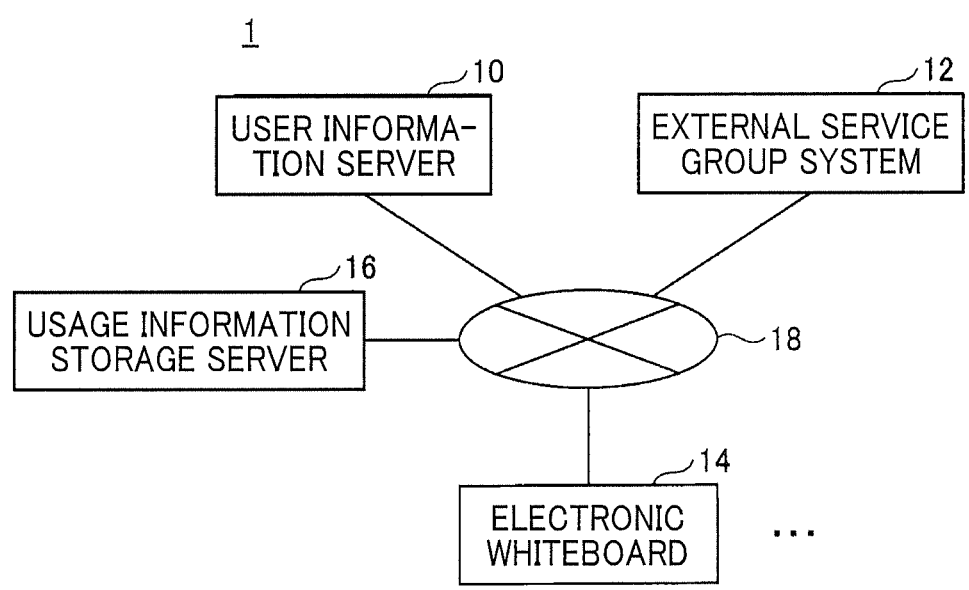
FIG. 1 is a schematic diagram illustrating an example of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, a description is given of several embodiments of the present disclosure with reference to the drawings. In the present embodiment, an example of a meeting using an electronic whiteboard is described, but the present disclosure is not limited to the meeting and applies to various situations such as seminars and lectures.

FIG. 1 is a schematic diagram illustrating a configuration of an information processing system according to the present embodiment. The information processing system 1 illustrated in FIG. 1 includes a user information server 10, an external service group system 12, an electronic whiteboard 14, and a usage information storage server 16 communicably connected with each other through a network 18 such as the internet or a local area network (LAN).

The user information server 10, the electronic whiteboard 14, and the usage information storage server 16 implement an electronic whiteboard system. The electronic whiteboard system provides functions related to the electronic whiteboard 14 by operating in cooperation with the external service group system 12 outside the electronic whiteboard system.

The external service group provided by the external service group system 12 indicates an integrated service such as Office 365 (registered trademark) including a user service, a shared site service, a storage service, an email service, a schedule service (calendar service), and the like.

The external service group is provided so that services such as the user service, the shared site service, the storage service, the email service, and the schedule service are used with the same user account. The external service group provided by the external service group system 12 is also called groupware, and each service belonging to the same external service group is used with the same authentication information (combination of identifier (ID) and password, access token, etc.). The external service groups may be different for each user and may be one or more. The external service group does not have to be operated by a different entity (company or the like) and does not have to be an external service as long as the external service group includes the user service and the shared site service. The external service group system 12 is implemented by one or more computers.

The user information server 10 stores a user information list, external service settings information, and the like, which is described below, and is used by the external service group system 12 or the electronic whiteboard 14. The user information server 10 may be shared by a plurality of electronic whiteboards 14 and may not be on the same network segment. Further, the user information server 10 may be included in the electronic whiteboard 14. The user information server 10 is implemented by one or more computers.

The electronic whiteboard 14 is used in a meeting in which a plurality of users participate. The electronic whiteboard 14 displays an image drawn by, for example, an electronic pen or a hand. The electronic whiteboard 14 also displays an image of an electronic file read from a universal serial bus (USB) memory, a personal computer (PC) connected through a cable, or the external service group system 12, or the like. Further, the electronic whiteboard 14 displays an image captured by a camera.

The electronic whiteboard 14 is an example and may be any device as long as the device is shared by a plurality of users, such as a meeting system terminal, a display, and a projector. The electronic whiteboard 14 is an example of an information processing apparatus shared and used by a plurality of users. The usage information storage server 16 stores electronic whiteboard usage information, shared site information, etc., which is described below, and is used by the electronic whiteboard 14.

The configuration of the information processing system 1 illustrated in FIG. 1 is an example. For example, at least a part of the functions of the user information server 10, the external service group system 12, or the usage information storage server 16 may be provided in the electronic whiteboard 14. The information processing system 1 may implement at least a part of the functions of the user information server 10, the external service group system 12, the electronic whiteboard 14, or the usage information storage server 16, by an information processing apparatus other than the user information server 10, the external service group system 12, the electronic whiteboard 14, and the usage information storage server 16.

Figure 2:
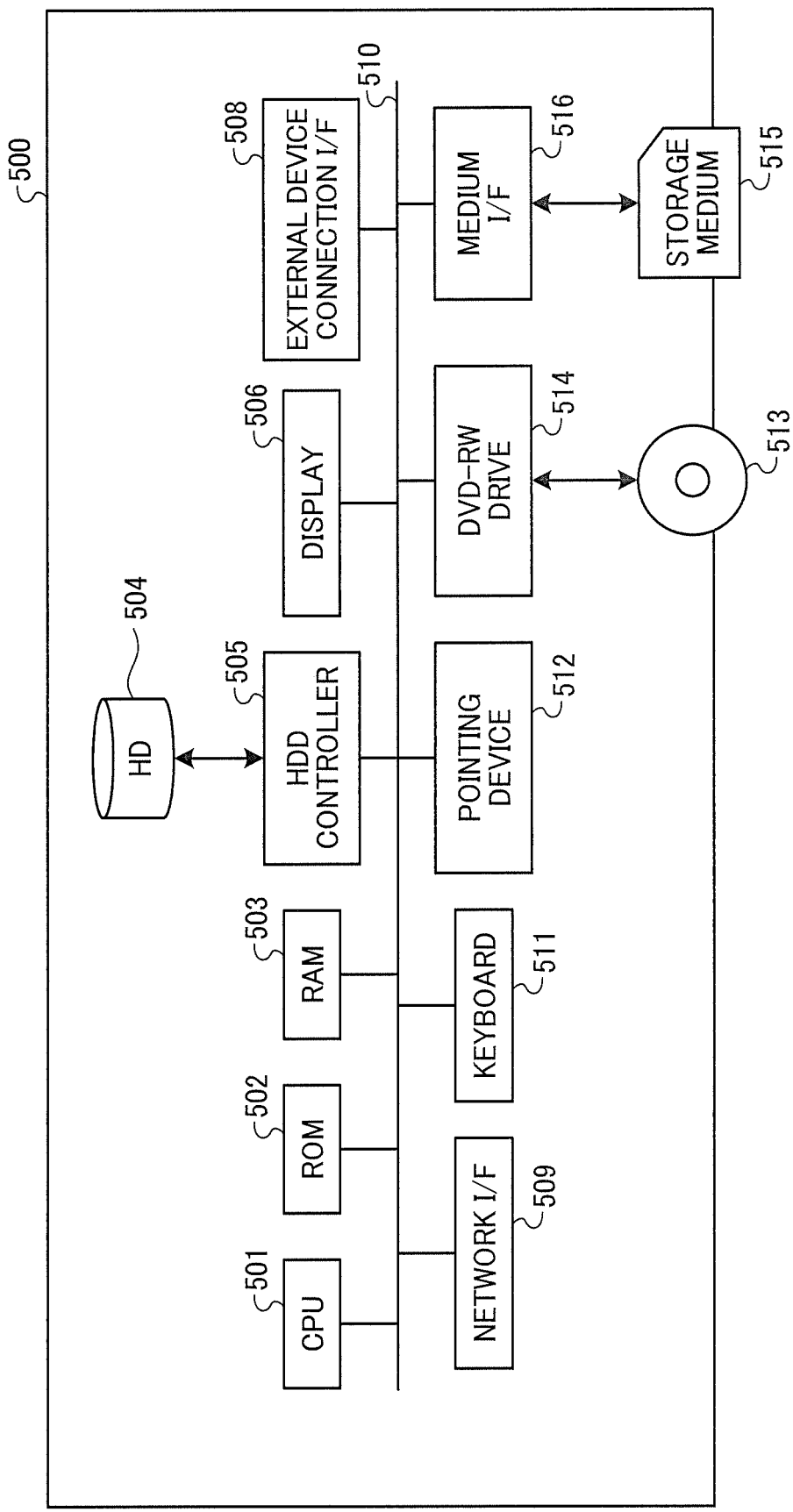
FIG. 2 is a block diagram illustrating an example of a hardware configuration of a computer, according to embodiments of the present disclosure.

The user information server 10, the external service group system 12, and the usage information storage server 16 illustrated in FIG. 1 are implemented by a computer 500 having a hardware configuration as illustrated in FIG. 2, for example. FIG. 2 is a block diagram illustrating an example of a hardware configuration of a computer according to the present embodiment.

As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

Among these elements, the CPU 501 controls entire operation of the computer 500 according to the program. The ROM 502 stores a program such as an initial program loader (IPL) used for driving the CPU 501. The RAM 503 is used as a work area for the CPU 501. The HD 504 stores various data such as a control program. The HDD controller 505 controls reading and writing of various data from and to the HD 504 under control of the CPU 501.

The display 506 displays various information such as a cursor, menu, window, character, or image. The external device connection I/F 508 is an interface for connecting various external devices. The external device in this case is, for example, a USB memory or a printer. The network I/F 509 is an interface for performing data communication using the network 18. The data bus 510 is an address bus, a data bus, or the like for electrically connecting each element such as the CPU 501.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to the storage medium 515 such as a flash memory.

Figure 3:
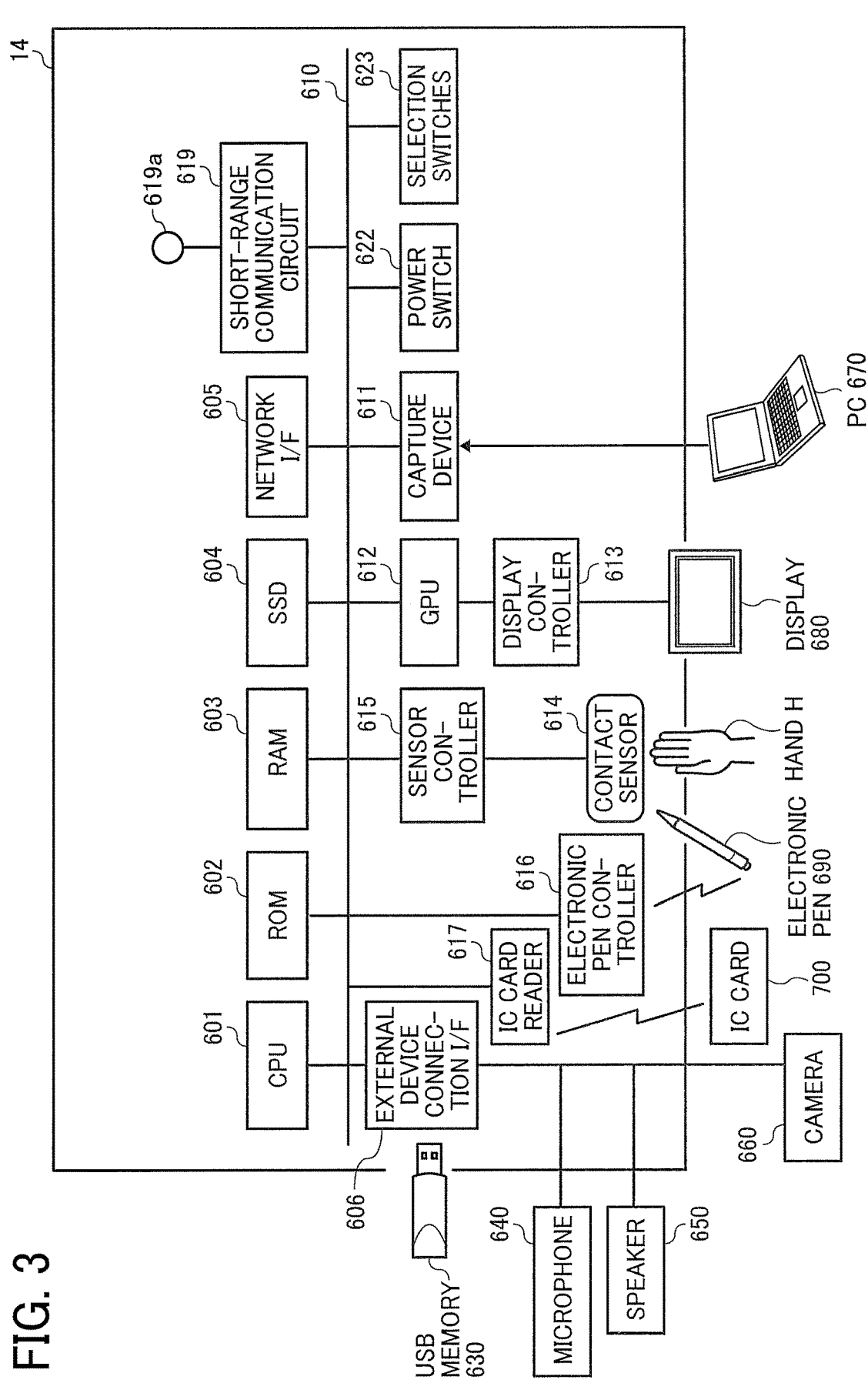
FIG. 3 is a block diagram illustrating an example of a hardware configuration of an electronic whiteboard, according to embodiments of the present disclosure.

FIG. 3 is a block diagram illustrating a hardware configuration of an electronic whiteboard according to the present embodiment. As illustrated in FIG. 3, the electronic whiteboard 14 includes a CPU 601, a ROM 602, a RAM 603, a solid state drive (SSD) 604, a network I/F 605, and an external device connection I/F 606.

Among these elements, the CPU 601 controls entire operation of the electronic whiteboard 14 according to the program. The ROM 602 stores programs used for driving the CPU 601 such as an initial program loader (IPL). The RAM 603 is used as a work area for the CPU 601. The SSD 604 stores various data such as a program for the electronic whiteboard 14.

The network I/F 605 controls communication with the network 18. The external device connection I/F 606 is an interface for connecting various external devices. The external devices in this case are, for example, the USB memory 630, a microphone 640, a speaker 650, and a camera 660.

Further, the electronic whiteboard 14 includes a capture device 611, a graphics processing unit (GPU) 612, a display controller 613, a contact sensor 614, a sensor controller 615, an electronic pen controller 616, an integrated circuit (IC) card reader 617, a short-range communication circuit 619, an antenna 619a for the short-range communication circuit 619, a power switch 622 and selection switches 623.

The capture device 611 causes a display of an external PC 670 to display video data as a still image or a moving image. The GPU 612 is a semiconductor chip dedicated to processing a graphical image. The display controller 613 controls and manages screen display so as to output an image from the GPU 612 to a display 680 or the like.

The contact sensor 614 detects contact with the display 680 by an electronic pen 690 or a user's hand H. The sensor controller 615 controls processing of the contact sensor 614. The contact sensor 614 performs input of coordinates and detection of coordinates by an infrared cutoff method. The light-receiving elements emit a plurality of infrared rays parallel to a surface of the display 680. The light-receiving elements receive light passing in the direction that is the same as an optical path of the emitted infrared rays, which are reflected by the reflector frame. More specifically, the display 680 is provided with two light-receiving elements disposed on both upper side ends of the display 680, and a reflector frame surrounding the sides of the display 680.

The contact sensor 614 outputs an identifier (ID) of the infrared ray that is blocked by an object (such as the user's hand) after being emitted from the light-receiving elements, to the sensor controller 615. Based on the ID of the infrared ray, the sensor controller 615 detects a specific coordinate that is touched by the object. The electronic pen controller 616 communicates with the electronic pen 690 to detect contact by the tip or bottom of the electronic pen 690 with the display 680.

The IC card reader 617 reads identification information unique to the IC card 700 from a radio frequency (RF) tag embedded in the IC card 700 by wireless communication. The IC card reader 617 may be included in the electronic whiteboard 14 or may be external to the electronic whiteboard 14. Note that the IC card 700 may be included in a smart device such as a smartphone. The electronic whiteboard 14 may use a device other than the IC card reader 617 as long as the device can acquire identification information capable of identifying the user, and may use a biometric authentication device (fingerprint, palm print, iris, face, etc.), a barcode reading device, or the like.

The short-range communication circuit 619 is a communication circuit such as near field communication (NFC) or Bluetooth (registered trademark). The power switch 622 controls power to the electronic whiteboard 14. The selection switches 623 are a group of switches for adjusting brightness, hue, etc., of the display 680, for example.

The electronic whiteboard 14 further includes a bus line 610. The bus line 610 is an address bus, a data bus, or the like for electrically connecting each component such as the CPU 601 illustrated in FIG. 3.

The contact sensor 614 is not limited to the infrared blocking system type described above and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object against the display. In addition to or as an alternative to detecting contact by the tip or bottom of the electronic pen 690, the electronic pen controller 616 may also detect contact by another part of the electronic pen 690, such as a part held by a hand of the user.

Figure 4:
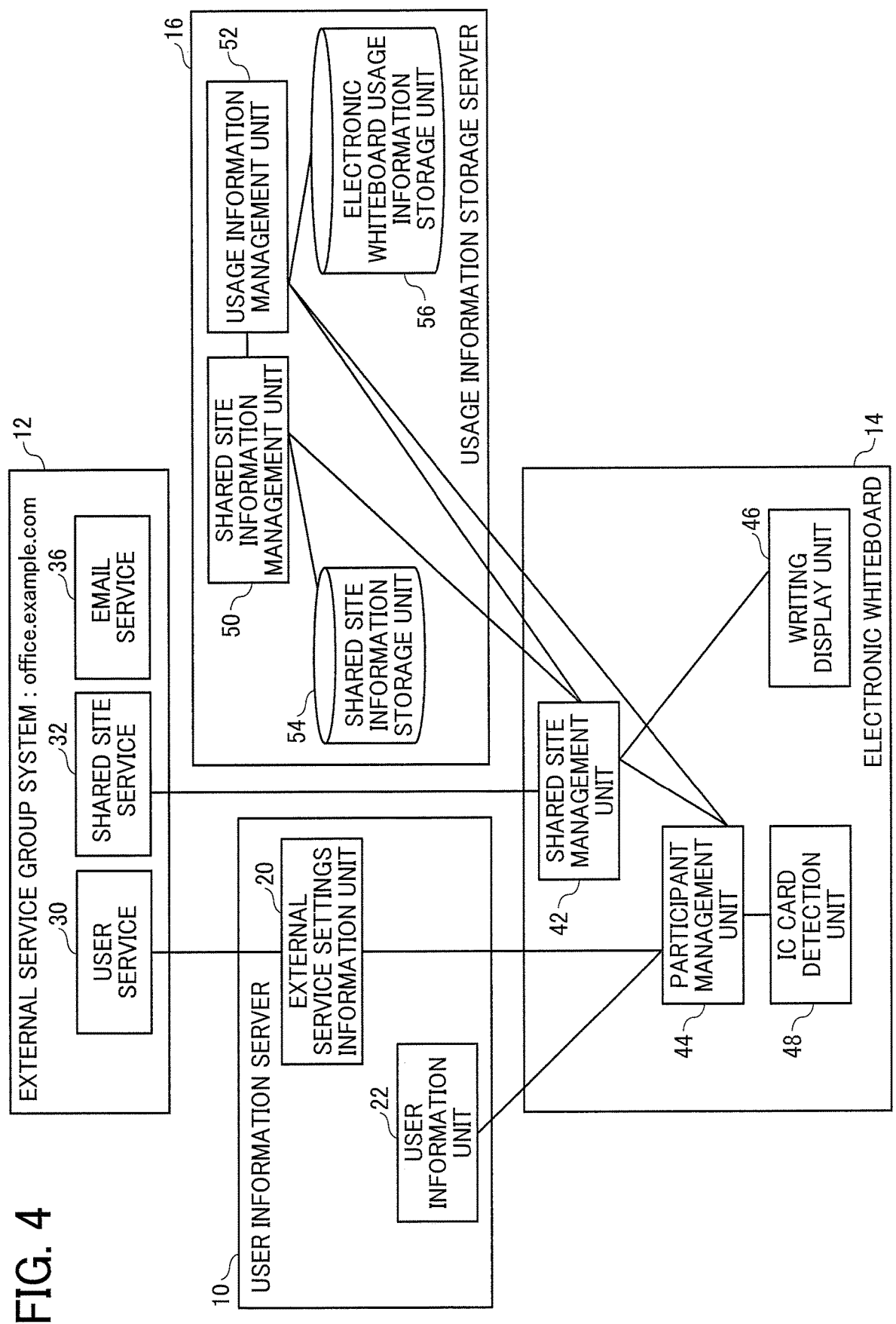
FIG. 4 is a block diagram illustrating an example of a functional configuration of the information processing system according to embodiments of the present disclosure.

The information processing system 1 according to the present embodiment is implemented, for example, by a functional configuration illustrated in FIG. 4. FIG. 4 is a block diagram illustrating the functional configuration of the information processing system according to the present embodiment. The functional configuration in FIG. 4 omits components unnecessary for the description of the present embodiment as appropriate.

The information processing system 1 illustrated in FIG. 4 includes a user information server 10, an external service group system 12, an electronic whiteboard 14, and a usage information storage server 16. FIG. 4 illustrates an external service group system "office.example.com" as an example of the external service group system 12.

The external service group system 12 exemplifies a user service 30, a shared site service 32, and an email service 36 as an external service group provided to a user. The user service 30 of the external service group system 12 stores, for example, account information as illustrated in FIG. 5. FIG. 5 is a diagram illustrating an example of the account information. As illustrated in FIG. 5, the user service 30 of the external service group system 12 stores a user ID, a name, and an email address as the account information.

The shared site service 32 provides a site (shared site) shared by a plurality of users. The shared site allows users to read and save files. Each shared site is created to serve for a particular purpose. A plurality of users who work for the same purpose (a plurality of users who work in groups) reads and saves files in the same shared site.

The email service 36 stores an email address for each user in the external service group system 12 and provides an email function to the user. The email service 36 stores emails addressed to the user's email address in the external service group system 12.

The user information server 10 includes an external service settings information unit 20 and a user information unit 22. The user information unit 22 stores, for example, a user information list illustrated in FIG. 6. FIG. 6 is a diagram illustrating an example of the user information list. As illustrated in FIG. 6, the user information list stores a user ID, a name, an email address, an external service setting ID, and identification information.

The email address is different from the email address in FIG. 5, and for example, the email address used in an intranet. The external service setting ID is information for identifying external service settings information described below. The identification information is, for example, identification information unique to the IC card 700. According to the user information list illustrated in FIG. 6, the user ID and the external service settings information is identified from the identification information read from the user's IC card 700.

The external service settings information unit 20 stores, for example, external service settings information as illustrated in FIG. 7. FIG. 7 is a diagram illustrating an example of the external service settings information. The external service settings information illustrated in FIG. 7 is settings information that differs for each user using the external service group system 12. The external service settings information stores the external service setting ID, the user ID, the address information, an external service user ID, and an external service authentication token.

The address information and the external service user ID are examples of connection information to the external service group system 12. The external service authentication token is an example of authentication information of the external service group system 12.

The electronic whiteboard 14 includes a shared site management unit 42, a participant management unit 44, a writing display unit 46, and an IC card detection unit 48. The IC card detection unit 48 reads the identification information from the detected IC card 700 of the user. The participant management unit 44 manages participants of a meeting in a participant management information list as illustrated in FIG. 8, for example.

FIG. 8 is a diagram illustrating an example of a participant management information list. The participant management information list includes a user ID of a user recognized as a participant of the meeting, information indicating whether the participant is an organizer, external service settings information, and the email address. For example, the participant management unit 44 identifies the user information from the user information list of FIG. 6 using the identification information read by the IC card detection unit 48 and stores the user ID of the identified user information as the user ID of the participant in the participant management information list.

The participant management information list in FIG. 8 illustrates an example in which the participant with the user ID "user001" is the organizer among the participants with the user IDs "user001", "user002", and "user004". The participant management unit 44 transmits notification to the usage information management unit 52 of the usage information storage server 16. Specifically, the participant management unit 44 notifies the time when the meeting starts and the user ID of the organizer at the time when the participant (organizer) is first added when the use of the electronic whiteboard 14 is started. After that, the participant management unit 44 notifies the user ID of the participant every time the participant is added during the meeting. The participant management unit 44 also notifies the end time of the meeting when the use of the electronic whiteboard 14 is finished. The device ID of the electronic whiteboard 14 is included in each notification.

The writing display unit 46 accepts the user's writing on the electronic whiteboard 14 and displays the contents of the writing. The shared site management unit 42 displays a shared site selection screen described below. On the shared site selection screen, shared sites are searched, and a shared site is selected from the search result. The shared site management unit 42 transmits the shared site name list in the search result to the shared site information management unit 50 and acquires a user list (user ID list) of each shared site. Further, the shared site management unit 42 acquires the user information list illustrated in FIG. 6 from the user information unit 22. The shared site management unit 42 determines the name corresponding to the user ID of each shared site based on the user ID list of each shared site and the user information list illustrated in FIG. 6. As a result, the users of the shared site are displayed in addition to the shared site name on the shared site selection screen.

When the shared site is selected, the shared site management unit 42 notifies the usage information management unit 52 of the usage information storage server 16 of the name of the selected shared site and the device ID of the electronic whiteboard 14. Also, the shared site management unit 42 displays a participant suggestion screen when the shared site is selected. The suggested participants displayed on the participant suggestion screen are users of the selected shared site. Note that users of the shared site that have already been selected as participants are not displayed as suggested participants on the participant suggestion screen.

Further, the shared site management unit 42 displays a shared site save screen described below. The shared site save screen saves the contents written in the electronic whiteboard 14 as a file on the shared site and transmits a uniform resource locator (URL) of the saved file by an email. The email is sent to the user recognized as the participant by the participant management unit 44.

The usage information storage server 16 includes a shared site information management unit 50, a usage information management unit 52, a shared site information storage unit 54, and an electronic whiteboard usage information storage unit 56. The usage information management unit 52 stores, for example, the electronic whiteboard usage information illustrated in FIGS. 9 and 10 in the electronic whiteboard usage information storage unit 56. FIG. 9 and FIG. 10 are diagrams illustrating examples of electronic whiteboard usage information. As illustrated in FIGS. 9 and 10, the electronic whiteboard usage information includes a device ID, date and time, and event. In response to receiving the notification from the shared site management unit 42 and the participant management unit 44, the usage information management unit 52 adds information received with the notification to the electronic whiteboard usage information illustrated in FIGS. 9 and 10.

FIG. 9 illustrates an example of the electronic whiteboard usage information up to "Nov. 10, 2018 12:51" of the electronic whiteboard 14 having the device ID "K100029". In FIG. 9 and FIG. 10, the event "Start meeting" indicates a start of a meeting. The event "End meeting" indicates an end of the meeting.

The event "Add user user ID" indicates that the user with the user ID started using the electronic whiteboard 14. The event "Select site shared site name" indicates that a shared site is selected.

For example, in FIG. 9, Mary with the user ID "user001" held the IC card 700 over the IC card reader 617 at "10:01" and started using the electronic whiteboard 14 with the device ID "K100029". After that, Ito with the user ID "user004", Suzuki with the user ID "user005", and Kudoh with the user ID "user006" each held the IC card 700 of his or her own over the IC card reader 617 and started using the electronic whiteboard 14 having the device ID "K100029". Also, a shared site with the shared site name "AbcProject"

is selected at "10:05". The use of the electronic whiteboard 14 having the device ID "K100029" is finished at "10:50".

Further, in FIG. 9, Mary with the user ID "user001" held the IC card 700 over the IC card reader 617 at "12:01" and started using the electronic whiteboard 14 of the device ID "K100029". After that, Sato with the user ID "user002" and Saito with the user ID "user003" each held the IC card 700 of his or her own over the IC card reader 617 and started using the electronic whiteboard 14 having the device ID "K100029". The shared site with the shared site name "AbcTech" is selected at "12:05". The use of the electronic whiteboard 14 having the device ID "K100029" is finished at "12:50".

In FIG. 10, the electronic whiteboard usage information indicating that the electronic whiteboard 14 having the device ID "K100029" is used from "13:01 to 14:10 of Nov. 12, 2018" is added to the electronic whiteboard usage information illustrated in FIG. 9.

For example, in FIG. 10, Mary with the user ID "user001" held the IC card 700 over the IC card reader 617 at "13:01" and started using the electronic whiteboard 14 having the device ID "K100029". After that, Sato with the user ID "user002" and Itoh with the user ID "user004" held the IC card 700 over the IC card reader 617 and started using the electronic whiteboard 14 having the device ID "K100029". Also, a shared site with the shared site name "AbcProject" is selected at "13:05". After that, Kudoh with the user ID "user006" held the IC card 700 over the IC card reader 617 and started using the electronic whiteboard 14 having the device ID "K100029". The use of the electronic whiteboard 14 having the device ID "K100029" is finished at "14:10".

The shared site information management unit 50 stores, for example, the shared site information illustrated in FIG. 11 in the shared site information storage unit 54. FIG. 11 is a diagram illustrating an example of the shared site information. The shared site information is created based on the electronic whiteboard usage information illustrated in FIG. 9. As illustrated in FIG. 11, the shared site information includes a shared site name and user ID. The shared site name is a name of the shared site. The user ID is a participant in the meeting using the shared site.

For example, in the shared site information created to indicate an event at 13:00 on Nov. 12, 2018 illustrated in FIG. 11, the shared site name "AbcProject" and the user IDs "user001", "user004", "user005", and "user006" are associated with each other using the electronic whiteboard usage information of FIG. 9 indicating that "user001", "user004", "user005", and "user006" have participated in the meeting in which the shared site name "AbcProject" is selected.

Further, for example, the shared site name "AbcTech" and the user IDs "user001", "user002", and "user003" are associated with each other in the shared site information illustrated in FIG. 11 using the electronic whiteboard usage information of FIG. 9 indicating that "user001", "user002", and "user003" were participating in the meeting where the shared site name "AbcTech" was selected.

In the present embodiment, the shared site information is created based on the electronic whiteboard usage information. Alternatively, the user information (external service user ID) of each shared site may be acquired from the shared site service 32, and converted to a user ID list using the external service settings information illustrated in FIG. 7, to be used as the user ID of the shared site information. However, since the user information of each shared site acquired from the shared site service 32 includes users who have only accessed the shared site, the information may be low in accuracy as such users are not always participants in the meeting. The electronic whiteboard usage information of FIGS. 9 and 10 is highly accurate because the users who actually participated in the meeting are stored.

When using the user information of each shared site acquired from the shared site service 32, since the number of user IDs associated with the shared site in the shared site information tend to increase, for example, the shared sites may be narrowed down by the number of times the shared site has been used and the date and time of the last use.

The shared site information management unit 50 acquires the electronic whiteboard usage information from the usage information management unit 52 at any time (for example, once an hour), determines the participants of the meeting in which the shared site is selected, and updates the shared site information illustrated in FIG. 11.

In addition, the shared site information management unit 50 returns to the shared site management unit 42, a user list of each shared site as illustrated in FIG. 13, based on the shared site name list as illustrated in FIG. 12 transmitted from the shared site management unit 42 of the electronic whiteboard 14.

FIG. 12 is a diagram illustrating the shared site name list transmitted to the shared site information management unit 50. FIG. 13 is a diagram illustrating a user list of each shared site returned by the shared site information management unit 50. FIG. 12 illustrates an example in which the electronic whiteboard usage information is as illustrated in FIG. 9. FIG. 13 is an example of the user list of each shared site returned when the shared site information of FIG. 11 and the shared site name list of FIG. 12 are transmitted to the shared site information management unit 50.

The configuration illustrated in FIG. 4 is an example, and other configurations may be used. For example, each unit of the electronic whiteboard 14 may be implemented by two devices, such that each component other than the IC card detection unit 48 and the writing display unit 46 of the electronic whiteboard 14 may be implemented by a server. In addition, the user information server 10 or the usage information storage server 16 may include any unit other than the IC card detection unit 48 and the writing display unit 46 of the electronic whiteboard 14 without changing the hardware configuration, or the user information unit 22 of the user information server 10 and the external service settings information unit 20 may be provided in different devices. Further, the shared site information management unit 50, the usage information management unit 52, the shared site information storage unit 54, and the electronic whiteboard usage information storage unit 56 of the usage information storage server 16 may be implemented by different devices without changing the hardware configuration.

Figure 14:
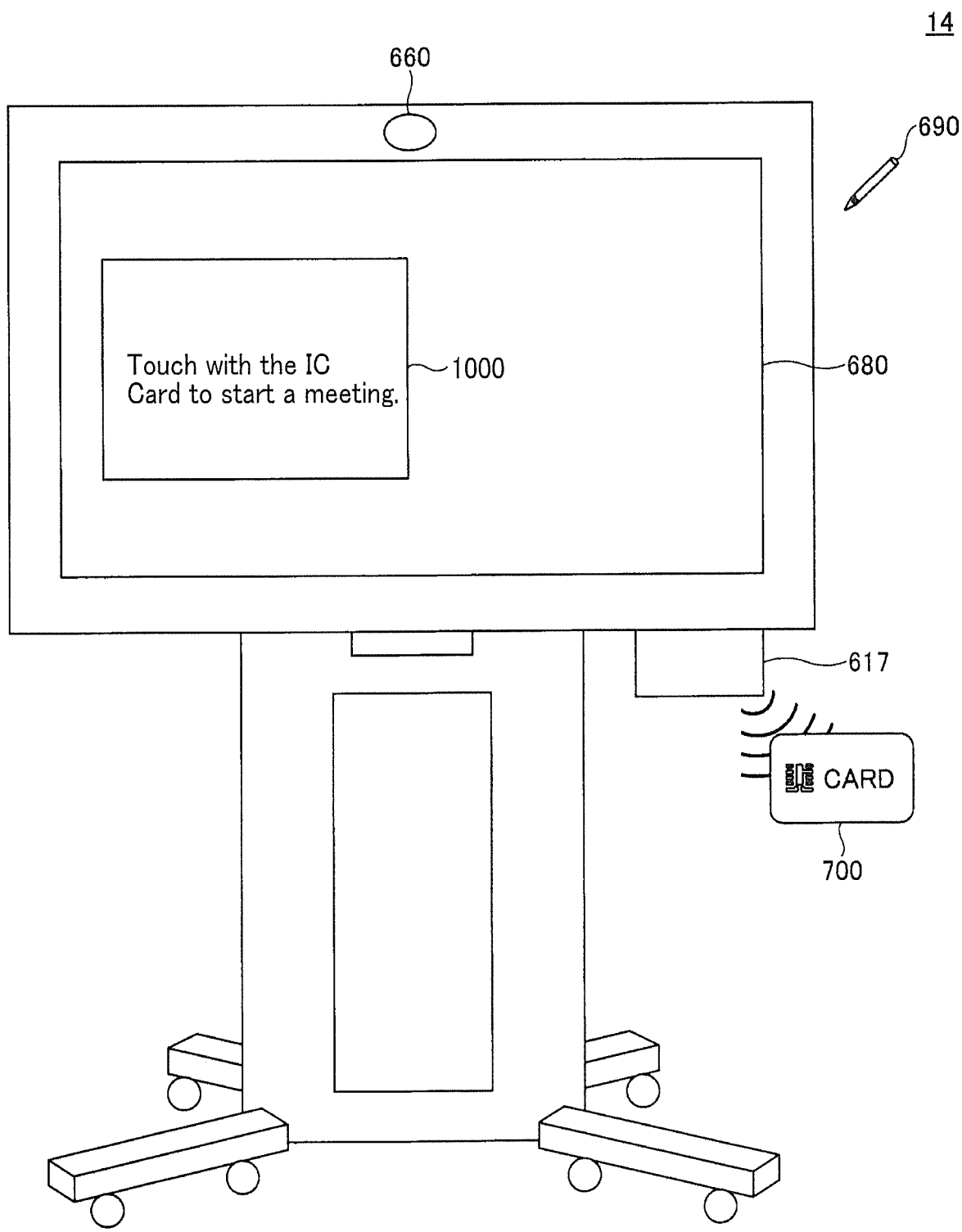
FIG. 14 is a diagram illustrating an external view of the electronic whiteboard according to embodiments of the present disclosure.

FIG. 14 is an illustration of an external view of the electronic whiteboard 14 according to the present embodiment. As illustrated in FIG. 14, the electronic whiteboard 14 includes a display 680, a camera 660, and an IC card reader 617. The display 680 displays an operation panel 1000 described below. The electronic whiteboard 14 according to the present embodiment includes at least the following functions 1 to 5.

Function 1. Electronic Whiteboard Function: The electronic whiteboard 14 accepts writing on the display 680 with an electronic pen 690 or a finger. The electronic whiteboard 14 sends image data of writing on the display 680 by an email or stores image data in a storage area provided by a storage service of the external service group system 12. The electronic whiteboard 14 also displays and edits a file such as meeting material.

Function 2. Authentication Function: The electronic whiteboard 14 acquires authentication information and the like using the IC card reader 617, the camera 660, the biometric authentication device and the like, and performs user authentication based on the authentication information and the like. The electronic whiteboard 14 may perform user authentication by itself or an external device may perform user authentication. The IC card reader 617 obtains authentication information such as identification information unique to the IC card 700 from the IC card 700 and authenticates the user based on a determination of whether the authentication information matches by referring to the user information list in FIG. 6. The user may be authenticated by extracting a feature amount from a facial image captured by the camera 660 and determining whether the feature amount matches a feature amount registered in a user information list.

Function 3. External Service Cooperation Function: The electronic whiteboard 14 cooperates with the external service group system 12. For example, the electronic whiteboard 14 acquires the user's schedule information from the external service using the external service settings information of the user who has been authenticated by the authentication function and transmits information such as writing on the electronic whiteboard or a meeting material by an email to a prospected participant. Further, for example, the electronic whiteboard 14 accesses a storage area provided by a storage service of the external service group system 12 of the user who has been authenticated, acquires a file, shares the file with another device, or transfer the file to other devices.

Function 4. Remote Sharing Function: The electronic whiteboard 14 shares and collaboratively edits the screen (remote execution of electronic whiteboard function) displayed on the electronic whiteboard 14 and shares an image or a video of a participant in the remote meeting captured by the camera 660, a sound of the microphone 640, or the like with a plurality of information processing apparatuses (other electronic whiteboards 14, the PC, and the like) installed at remote locations. Sharing a screen refers to the use of multiple information processing apparatuses installed at remote locations to display (remote sharing) the same content on each information processing apparatuses and discuss the content in a remote meeting. Editing collaboratively refers to writing on the same screen from a plurality of information processing apparatuses, editing files, and the like.

Function 5. Other Functions: The electronic whiteboard 14 may include an application similar to an application operating on a general PC or a smart device, such as a web browser or an email application.

The functions described above are implemented by hardware and software of the electronic whiteboard 14 that operate in cooperation. The software includes a plurality of pieces of software installed on the electronic whiteboard 14 as well as those operating in cooperation with the external device.

Figure 15:
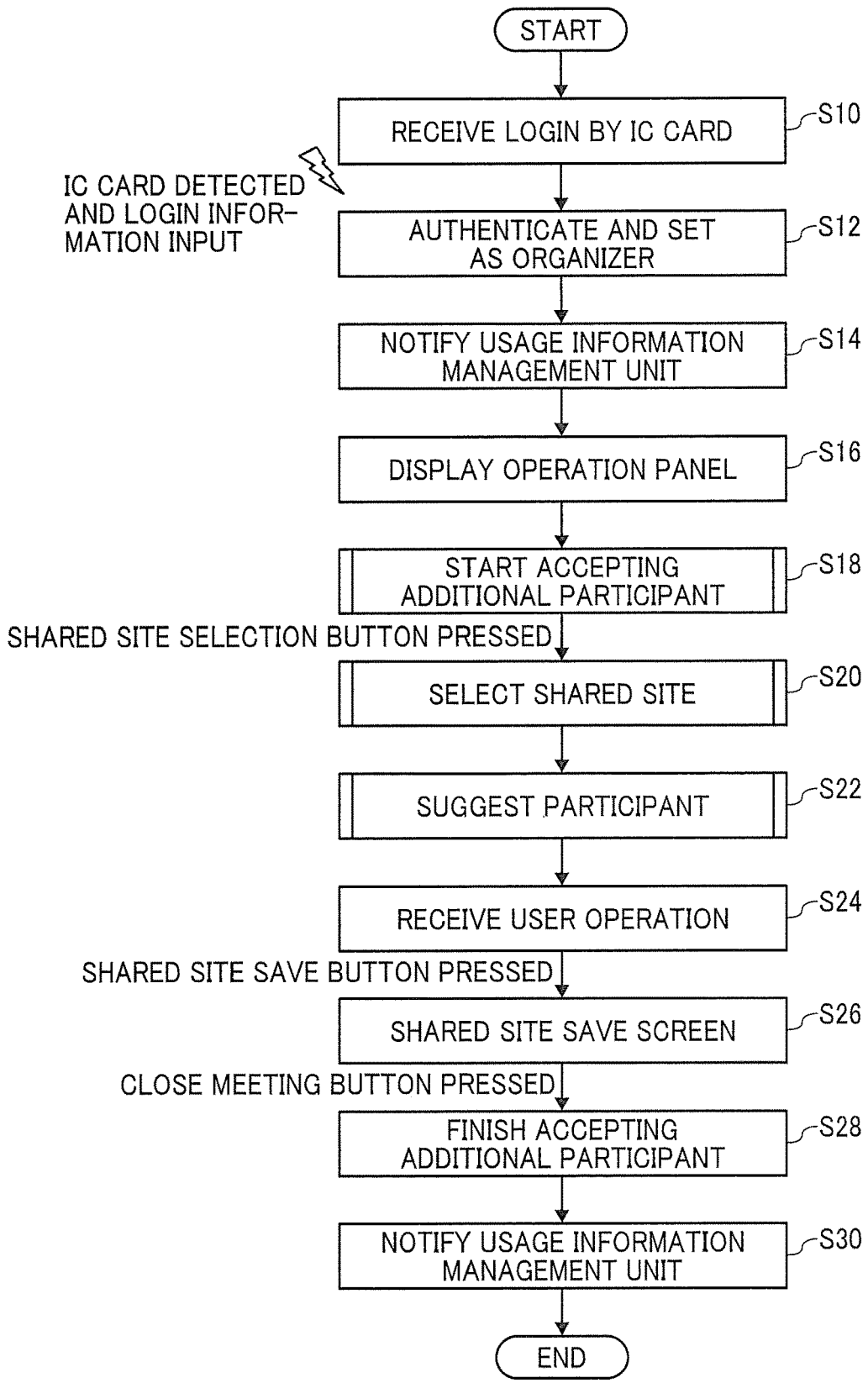
FIG. 15 is a flowchart illustrating an example of a process of holding a meeting using the electronic whiteboard.

The information processing system 1 according to the present embodiment holds a meeting using the electronic whiteboard 14 in a process as illustrated in FIG. 15, for example. FIG. 15 is a flowchart illustrating the process of holding a meeting using the electronic whiteboard.

In step S10, when the electronic whiteboard 14 is activated, the electronic whiteboard 14 displays, for example, the operation panel 1000 illustrated in FIG. 14, and waits for login by the IC card 700. The organizer of the meeting holds his/her IC card 700 over the IC card detection unit 48.

When the IC card detection unit 48 detects the IC card 700, the electronic whiteboard 14 identifies user information from the identification information read from the IC card 700, authenticates, and sets the user as an organizer in step S12. In the present embodiment, the user who has performed authentication first is set as the organizer of the meeting. The authentication in step S12 may be ID/password authentication or face authentication.

In step S14, the participant management unit 44 adds the authenticated user to the participant management information list as the organizer. In addition, the participant management unit 44 notifies the usage information management unit 52 of the usage information storage server 16 of the device ID, the time, the event indicating starting of meeting, and the event indicating starting of usage by the user.

Figure 19:
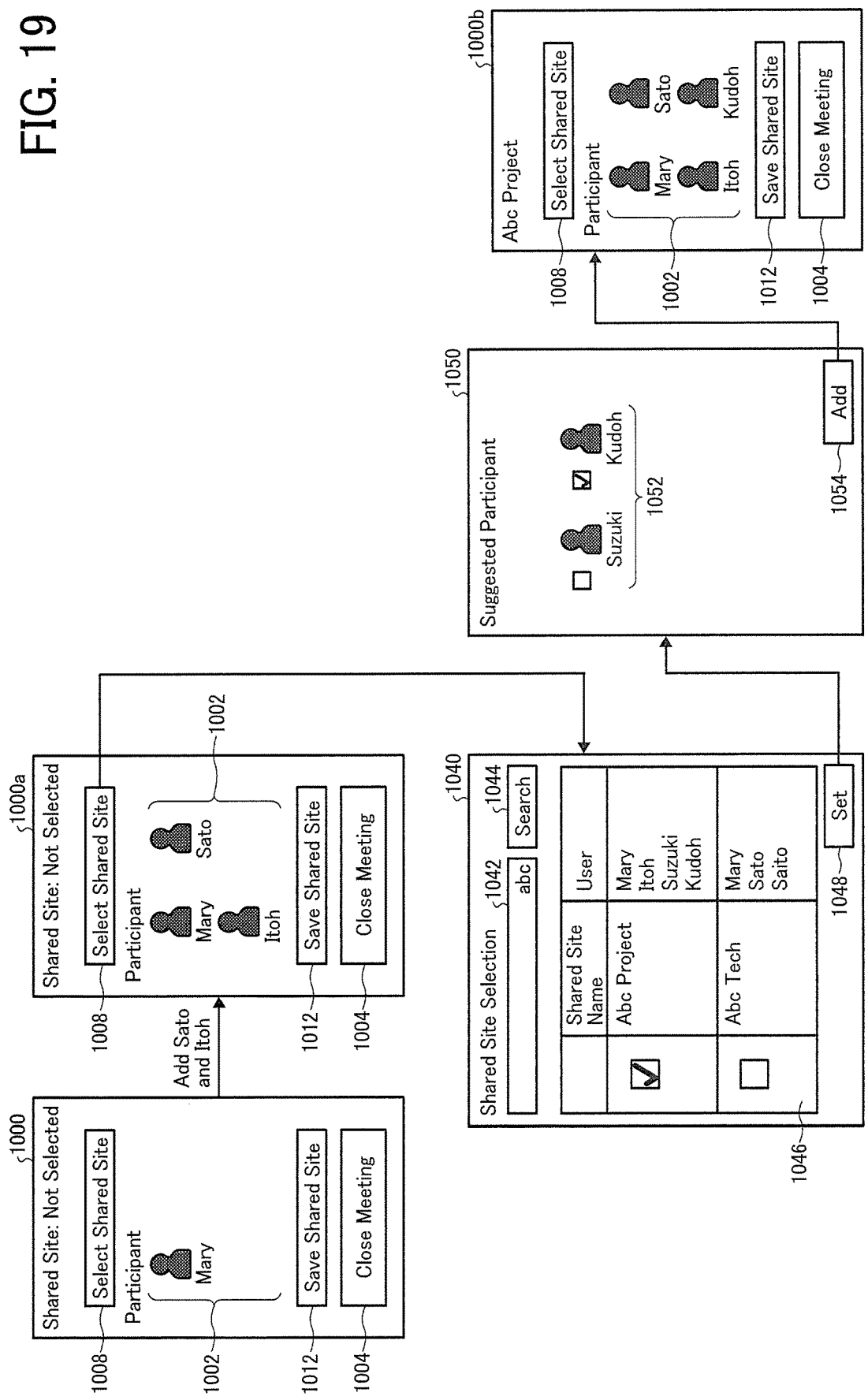
FIG. 19 is a diagram illustrating an example of a user interface (UI) displayed on the electronic whiteboard.

In step S16, the electronic whiteboard 14 displays, for example, an operation panel 1000 as illustrated in FIG. 19 as a UI. FIG. 19 is a diagram illustrating an example of the UI displayed on the electronic whiteboard 14. On the operation panel 1000 of FIG. 19, a participant list 1002, a meeting close button 1004, a shared site selection button 1008, and a shared site save button 1012 are displayed. On the operation panel 1000 of FIG. 19 displayed in step S16, only "Mary" who is the organizer is displayed in the participant list 1002.

Figure 16:
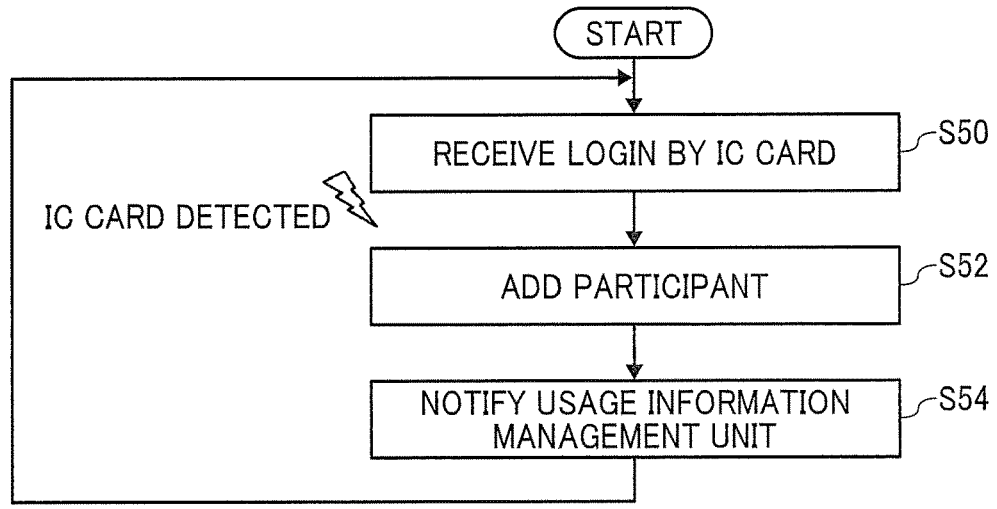
FIG. 16 is a flowchart illustrating an example of a process for receiving additional participant.

In step S18, the electronic whiteboard 14 starts accepting additional participants. FIG. 16 is a flowchart illustrating a process for accepting additional participants. In step S50, when the process of accepting additional participants is started, the electronic whiteboard 14 waits for a login by a user other than the organizer, performed by using the IC card 700 and the like.

A user other than the organizer holds his or her IC card 700 over the IC card detection unit 48. When detecting the IC card 700, the electronic whiteboard 14 identifies the user information from the identification information read from the IC card 700, authenticates, and sets the user as a meeting participant in step S52. The electronic whiteboard 14 adds the user who has been authenticated and set as the participant of the meeting to the participant list 1002. In addition, the electronic whiteboard 14 notifies the usage information management unit 52 of the usage information storage server 16, of start of usage by the added participant and the device ID in step S54. On the operation panel 1000*a* of FIG. 19, users other than the organizer who are authenticated and added as participants in the meeting are added to the participant list 1002.

Figure 17:
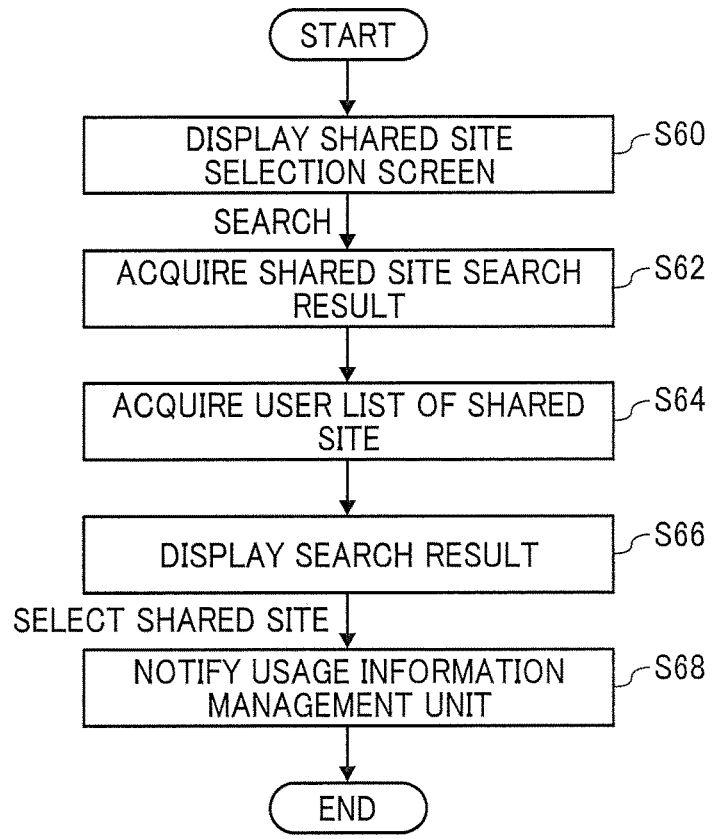
FIG. 17 is a flowchart illustrating an example of a shared site selection process.

Returning to step S20 in FIG. 15, it is assumed that the electronic whiteboard 14 accepted the pressing of the shared site selection button 1008. In response to pressing of the shared site selection button 1008, the shared site management unit 42 of the electronic whiteboard 14 starts the shared site selection. FIG. 17 is a flowchart illustrating an example of a shared site selection process.

In step S60, the electronic whiteboard 14 displays a shared site selection screen 1040 as illustrated in FIG. 19. On the shared site selection screen 1040, a search keyword input field 1042 for the shared site, a search button 1044, a search result display field 1046, and a setting button 1048 are displayed. The search result display field 1046 displays a shared site name, a user, and a check box for selecting a shared site.

In response to the pressing of the search button 1044 after the search keyword of the shared site is input in the input field 1042, the electronic whiteboard 14 uses, for example, the site search application programming interface (API), of the shared site service 32 to search for the shared site in step S62. The electronic whiteboard 14 acquires the search result of the shared site from the shared site service 32. In step S62, the electronic whiteboard 14 uses (sends to the shared site service 32) the external service authentication token included in the external service settings information (FIG. 7) of the organizer who first logged in to the meeting held using the electronic whiteboard 14, sends request to read the shared site to the shared site service 32, and acquires only the shared site for which the organizer has the authority among the many shared sites as the search result.

The electronic whiteboard 14 creates a shared site name list included in the search results of the shared sites. The electronic whiteboard 14 transmits the created shared site name list to the shared site information management unit 50 of the usage information storage server 16 as illustrated in FIG. 12 and acquires the user list of each shared site illustrated in FIG. 13 in step S64.

In step S66, the electronic whiteboard 14 displays the search result display field 1046 on the shared site selection screen 1040. By pressing the setting button 1048 on the shared site selection screen 1040 in FIG. 19, the shared site selected by the check box is set as the shared site to be used.

When the shared site to be used is set, the electronic whiteboard 14 proceeds to step S68 and notifies the usage information management unit 52 of the usage information storage server 16 of the event, of the shared site selection and the device ID.

Figure 18:
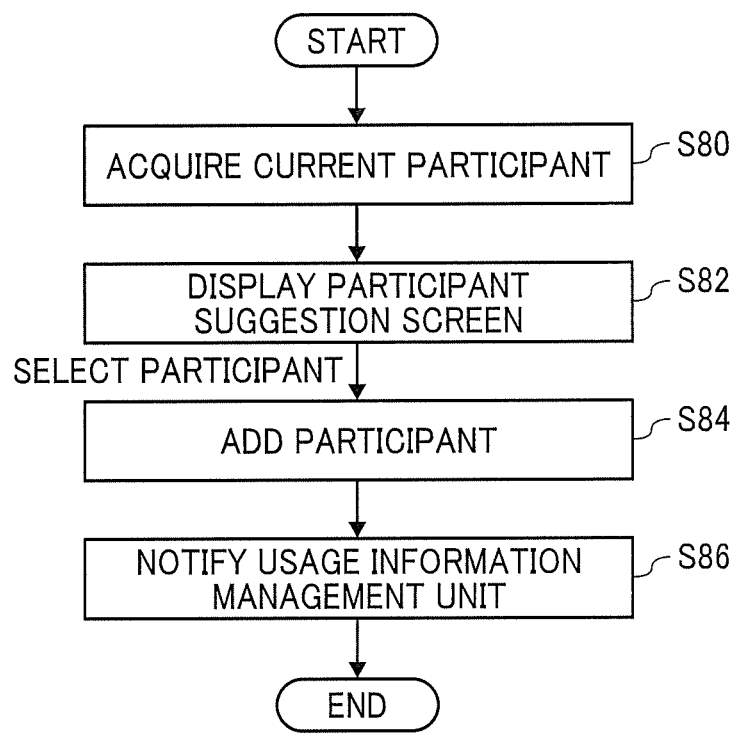
FIG. 18 is a flowchart illustrating an example of a participant suggestion process.

The shared site management unit 42 of the electronic whiteboard 14 in which the shared site to be used is set returns to step S22 of FIG. 15 to start the participant suggestion process. FIG. 18 is a flowchart illustrating an example of a participant suggestion process.

In step S80, the electronic whiteboard 14 acquires the current participant from the participant management information list illustrated in FIG. 8. In step S82, the electronic whiteboard 14 acquires the user list of the selected shared site from the user list of each shared site of FIG. 13 acquired in step S64 of FIG. 17. The electronic whiteboard 14 selects a user who is not included in the current participants from the users included in the user list of the selected shared site as a candidate for the participant (suggested participant). Then, the electronic whiteboard 14 displays the participant suggestion screen 1050 illustrated in FIG. 19.

On the participant suggestion screen 1050 of FIG. 19, suggested participants 1052 are displayed in a selectable manner by a check box. By pressing the add button 1054 on the participant suggestion screen 1050 of FIG. 19, the suggested participant 1052 selected by the check box is added as a participant to the participant management information list of FIG. 8.

In addition, in step S86, the electronic whiteboard 14 notifies the usage information management unit 52 of the usage information storage server 16, of the usage start event generated by the added participant and the device ID. Further, when the add button 1054 is pressed, the electronic whiteboard 14 displays the selected shared site and the added participants in the operation panel 1000b illustrated in FIG. 19. On the operation panel 1000b illustrated in FIG. 19, the shared site name "AbcProject" set on the shared site selection screen 1040 and the user name "Kudoh" of the added participant on the participant suggestion screen 1050 are added.

Here, an example in which the user is allowed to select a participant to be added from the suggested participants 1052 on the participant suggestion screen 1050 is described, however, all the users included in the user list of the selected shared site may be added to the participant management information list illustrated in FIG. 8 as participants.

Returning to step S24 of FIG. 15, the electronic whiteboard 14 displays a meeting screen and accepts an operation by the user such as writing on the electronic whiteboard 14.

Figure 20:
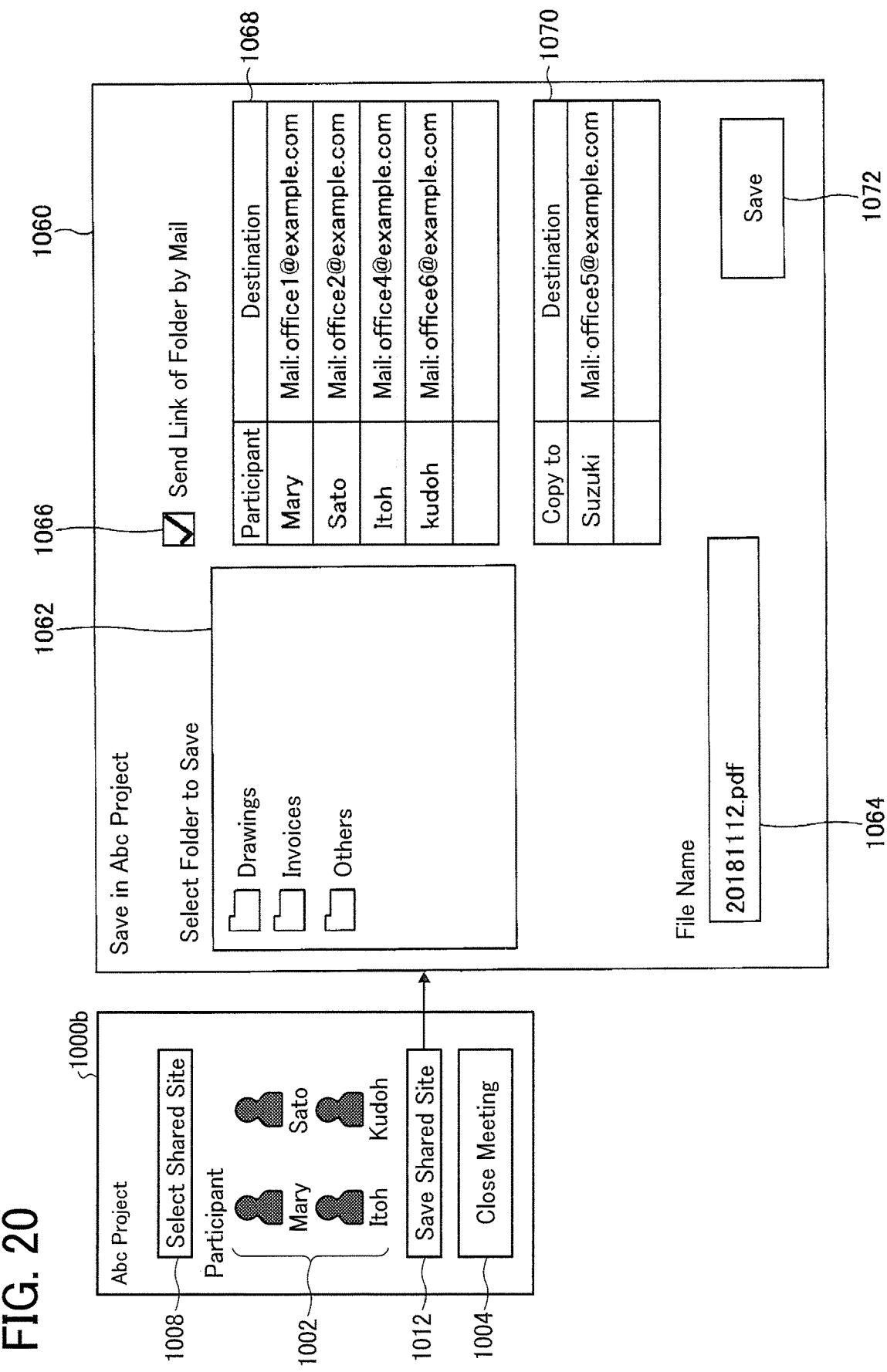
FIG. 20 is a diagram illustrating another example of the UI displayed on the electronic whiteboard.

In the description below, it is assumed that the electronic whiteboard 14 received pressing of the shared site save button 1012 on the operation panel 1000b in step S26. When the shared site save button 1012 is pressed, the shared site management unit 42 of the electronic whiteboard 14 displays a shared site save screen 1060 as illustrated in FIG. 20. FIG. 20 is a diagram illustrating an example of a UI displayed on the electronic whiteboard. On the shared site save screen 1060, a selection field 1062 for selecting a save destination folder from the selected shared site folders, a file name field 1064 for entering name of a file to save, and a check box 1066 for selecting whether or not to send a link of the saved file by an email, a participant's email destination list 1068, a "copy to" email destination list 1070, and a save button 1072 are displayed. The "copy to" email destination is a user who is not added to the current participant among the suggested participants 1052.

When displaying the shared site save screen 1060, the electronic whiteboard 14 uses the participant management information list illustrated in FIG. 8 to display the email destination list 1068 of the participants. Further, the electronic whiteboard 14 displays the users who are not added to the participant management information list of FIG. 8 among the suggested participants 1052 to the "copy to" email destination list 1070. In addition, the electronic whiteboard 14 acquires the information of the folder structure of the selected shared site from the shared site service 32, using the selected shared site name as a key.

Note that the electronic whiteboard 14 may send the email using the email addresses included in the participant management information list for the participants selected from the suggested participants 1052 on the participant suggestion screen 1050 and added to the participant management information list in FIG. 8. In addition, by using the information stored in the shared site service 32 during the meeting, access to the storage service of the added participant may be allowed. In this case, it is possible to perform control such that reading is not permitted and only writing is permitted.

For example, when the user executes saving, the electronic whiteboard 14 saves the file with the shared site name and the path of the saving destination folder as a key in order to save the file of the whiteboard content in the selected saving destination folder. In addition, the electronic whiteboard 14 may transmit, for example, a notification email illustrated in FIG. 21 in which the URL of the saved file is described in the text, to all destinations or a part of the destinations selected by a check box, or the like, in the participants email destination list 1068 and the "copy to" email destination list 1070, if the check box 1066 is selected to send the link of the saved file by email.

Figure 21:
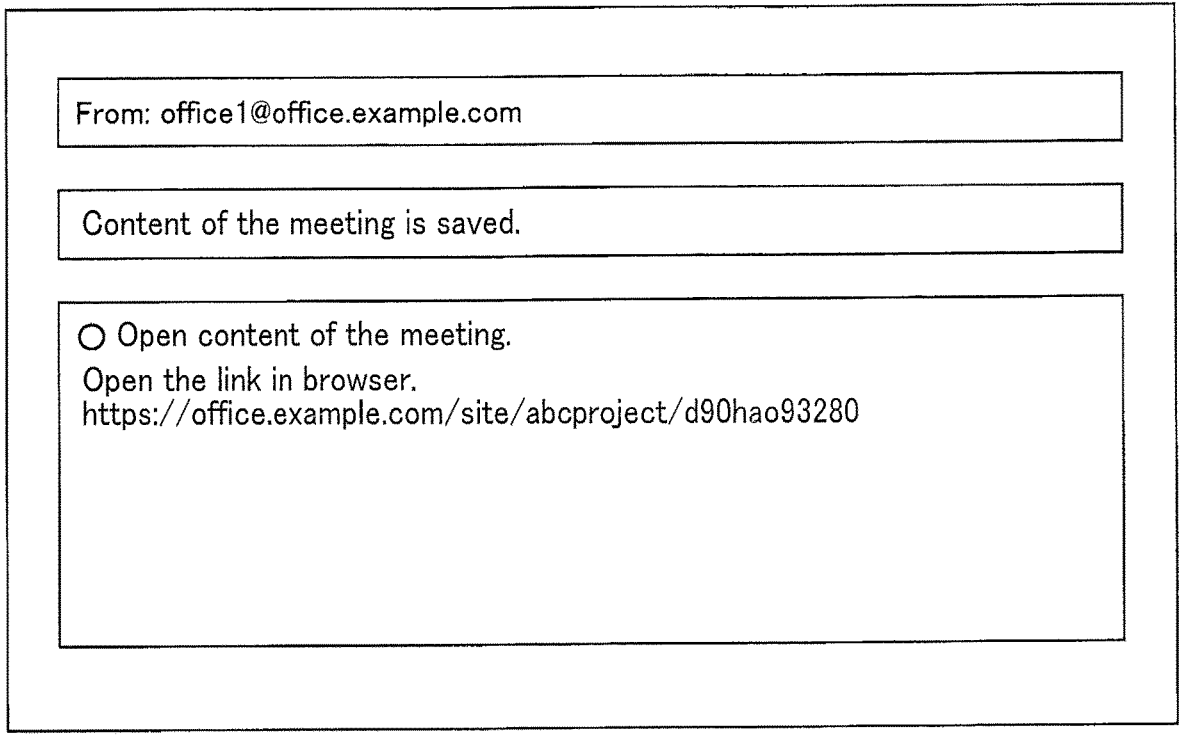
FIG. 21 is a diagram illustrating an example of a storage notification email.

FIG. 21 is a diagram illustrating an example of a storage notification email. In the text of the save notification email, a URL to open the file saved on the shared site is indicated. Note that URL is an example, and any information to open the file saved in the shared site, for example, a shared site name or a file path, may be indicated. Further, a file of the whiteboard content may be attached on the save notification email instead of the URL.

Returning to step S28 of FIG. 15, it is assumed that the electronic whiteboard 14 accepted pressing of the meeting close button 1004 on the operation panel 1000b. When the meeting close button 1004 is pressed, the electronic whiteboard 14 finishes accepting the addition of the participants and notifies the usage information management unit 52 of the usage information storage server 16 of the meeting close event in step S30.

Figure 22:
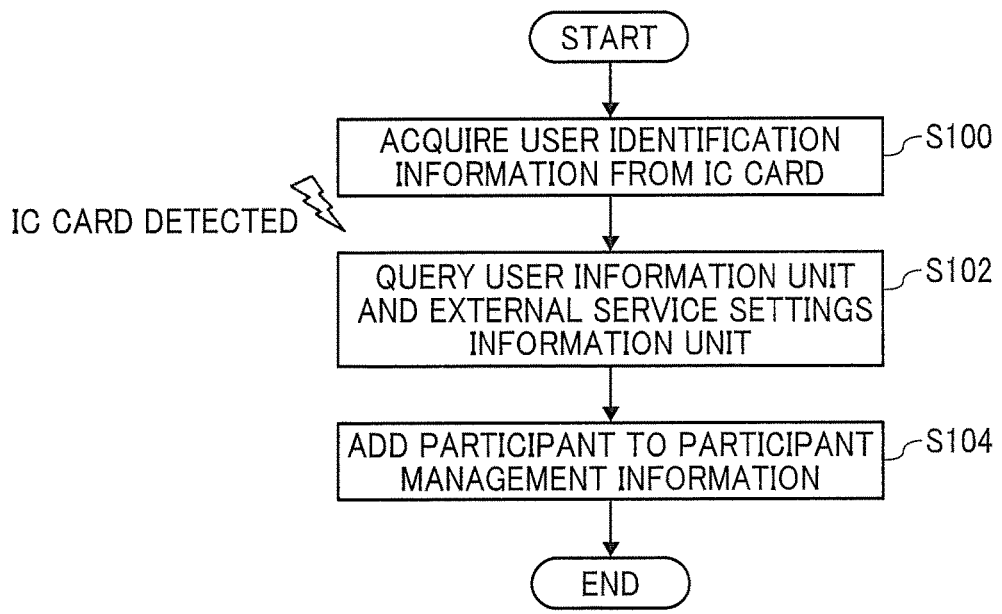
FIG. 22 is a flowchart illustrating an example of a process for authenticating and setting an organizer.

In step S12 of FIG. 15, the organizer is authenticated and set as an organizer by the process illustrated in FIG. 22, for example. FIG. 22 is a flowchart illustrating an example of a process for authenticating and setting the organizer. FIG. 22 illustrates a process after the IC card detection unit 48 of the electronic whiteboard 14 detected the IC card 700 and read identification information from the IC card 700.

In step S100, the participant management unit 44 acquires the identification information read from the IC card 700 by the IC card detection unit 48. In step S102, the participant management unit 44 refers to the user information list illustrated in FIG. 6 and identifies the user indicated by the identification information acquired in step S100 from the user information list illustrated in FIG. 6. Further, the participant management unit 44 refers to the external service settings information illustrated in FIG. 7 and identifies the external service settings information of the identified user from the external service settings information illustrated in FIG. 7. In step S104, the participant management unit 44 sets the identified user as the organizer and adds the user to the participant list 1002.

For example, the IC card detection unit 48 that has detected the IC card 700 of "Mary Smith" illustrated in the user information list in FIG. 6 reads the identification information "ICCARD-123" from the IC card 700. In step S100, the participant management unit 44 acquires the identification information "ICCARD-123" from the IC card detection unit 48. In step S102, the participant management unit 44 queries the external service settings information unit 20 and the user information unit 22 of the user information server 10 based on the acquired identification information "ICCARD-123".

The user information unit 22 searches the identification information "ICCARD-123", identifies the user information including the user ID "user001", and returns the user information to the participant management unit 44 of the electronic whiteboard 14. Further, the external service settings information unit 20 searches the identified user ID "user001", identifies the external service settings information "connect1 a" illustrated in FIG. 7 and returns the external service settings information to the participant management unit 44 of the electronic whiteboard 14.

In addition, the participant management unit 44 queries the external service settings information unit 20 about the email address of the external service settings information "connect1a". The external service settings information unit 20 uses the external service authentication token "eyJhbc11 . . . " of the external service settings information "connect1a" and identifies the email address "office1@office.example.com" of the user ID "office1" from the user service 30 and returns the email address to the participant management unit 44 of the electronic whiteboard 14.

In step S104, the participant management unit 44 stores the user with the user ID "user001" as the organizer in the participant management information list of FIG. 8, adds the user "user001" to the participant list 1002, and associates the external service settings information "connect1a" with the user "user001". As a result, the meeting organizer "Mary Smith" is registered in the participant management unit 44, and the user ID "user001", the external service setting ID "connect1a", and the email address "Office1@office.example.com" are added to the participant management information list illustrated in FIG. 8 in association with each other.

Figure 23:
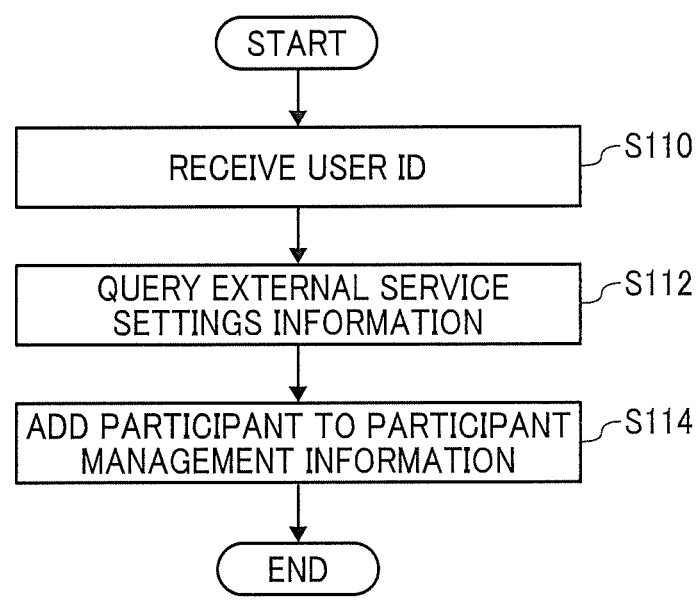
FIG. 23 is a flowchart illustrating an example of a process of adding a participant selected from suggested candidates for participants to the participant management information.

In step S84 of FIG. 18, a participant selected from the suggested participants 1052 is added to the participant management information list of FIG. 8, for example, by a process illustrated in FIG. 23. FIG. 23 is a flowchart illustrating the process of adding a participant selected from the suggested participants to the participant management information.

In step S110, the participant management unit 44 of the electronic whiteboard 14 receives the user ID of the participant selected from the suggested participants 1052. In step S112, the participant management unit 44 queries the external service settings information unit 20 about the external service settings information of the selected user ID. In step S114, the participant management unit 44 adds a participant selected from the suggested participants 1052 to the participant management information list illustrated in FIG. 8 based on the external service settings information of the participant selected from the suggested participants 1052.

For example, when "Kudoh" is selected from the suggested participants 1052, the participant management unit 44 queries the external service settings information unit 20 about the external service settings information corresponding to the user ID "user006".

The participant management unit 44 uses the external service settings information "connect6a" corresponding to the user ID "user006" returned from the external service settings information unit 20 and acquires the email address "office6@office.example.com" of the user ID "office6" from the user service 30. Then, the participant management unit 44 adds the user ID "user006", the external service settings information "connect6a", and the email address "office6@office.example.com" to the participant management information list in FIG. 8.

According to the process described above, shared site information associating the shared site used in the meeting and the participants of the meeting in the electronic whiteboard 14 is stored, and the participants associated with the selected shared site are used as the suggested participants 1052 in the present embodiment. As a result, workload in identifying the participants of the meeting can be reduced by suggesting participants who have attended the meeting using the shared site in the past as the suggested participants 1052. Further, various services related to meetings, such as sending emails on the information drawn on the electronic whiteboard and sending notifications about meetings, are provided using the information of the participants selected from the suggested participants 1052.

Further, in the present embodiment, adding a user who has not been authenticated by the IC card 700 or a user without the IC card 700 to a meeting is facilitated.

As described above, according to the present embodiment, participants corresponding to the selected shared site are suggested as candidates of participants, using the shared site information associating the participants of the meeting and the shared site based on the usage information of the electronic whiteboard 14. Therefore, according to the present embodiment, identifying the participants of the meeting using the shared site with the electronic whiteboard 14 is facilitated.

Figure 24:
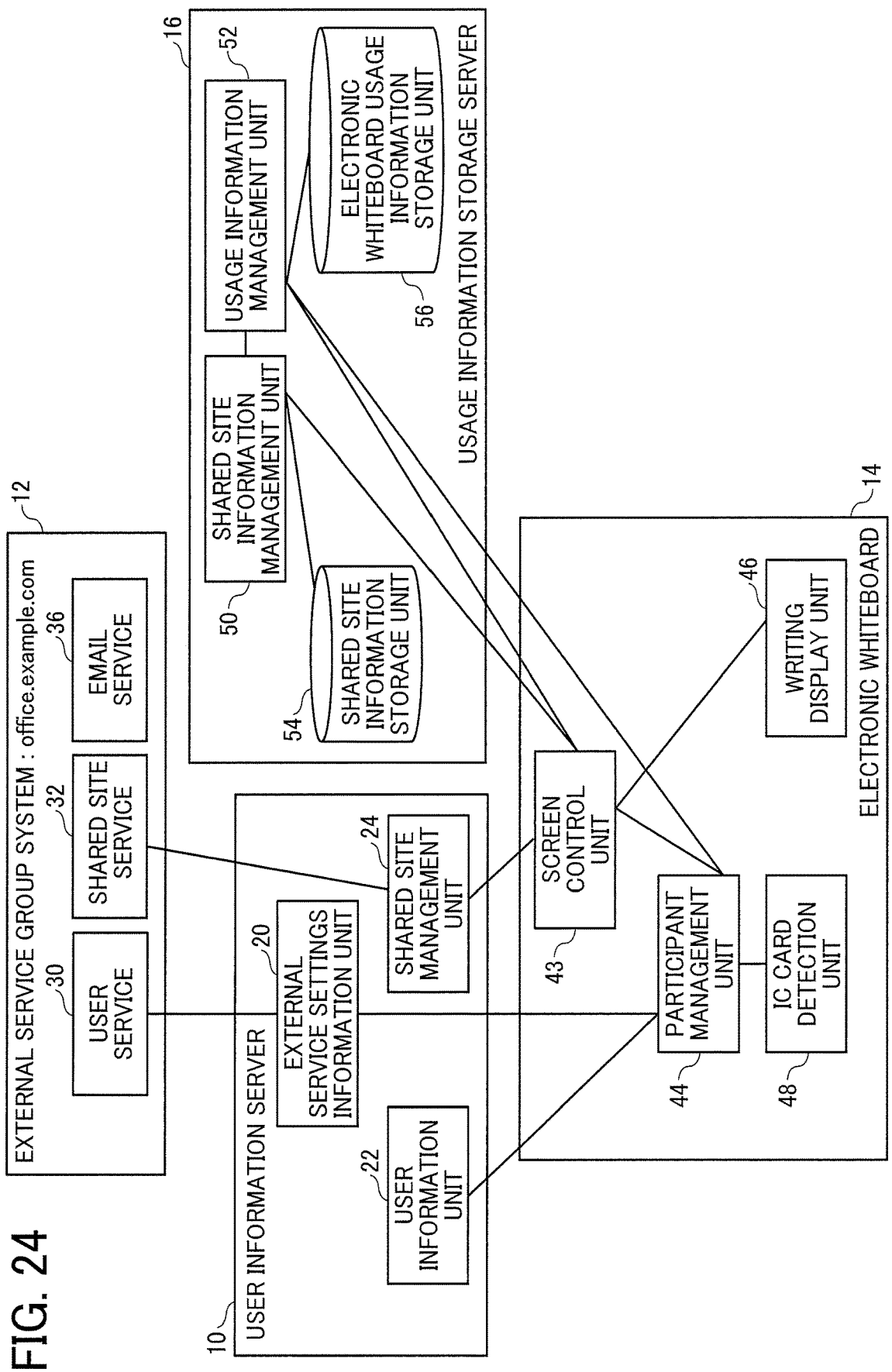
FIG. 24 is a diagram illustrating another example of the functional configuration of the information processing system according to embodiments of the present disclosure.

The functional configuration of the information processing system 1 may be implemented as illustrated in FIG. 24, in alternative to the example illustrated in FIG. 4 described above. FIG. 24 is a functional configuration diagram illustrating the information processing system according to the present embodiment. In the information processing system 1 illustrated in FIG. 24, the function of the shared site management unit 42 of FIG. 4 is transferred from the electronic whiteboard 14 to the user information server 10. The functional block diagram of FIG. 24 is the same as the functional block diagram of FIG. 4 except for a few parts, and therefore the description thereof is appropriately omitted.

The electronic whiteboard 14 of FIG. 24 includes a screen control unit 43, a participant management unit 44, a writing display unit 46, and an IC card detection unit 48. Further, the user information server 10 includes an external service settings information unit 20, a user information unit 22, and a shared site management unit 24.

The screen control unit 43 of the electronic whiteboard 14 implements the same function as the shared site management unit 42 of FIG. 4 by using the shared site management unit 24 of the user information server 10. For example, the electronic whiteboard 14 accesses the shared site service 32 through the user information server 10 without acquiring the external service authentication token from the user information server 10.

Figure 25:
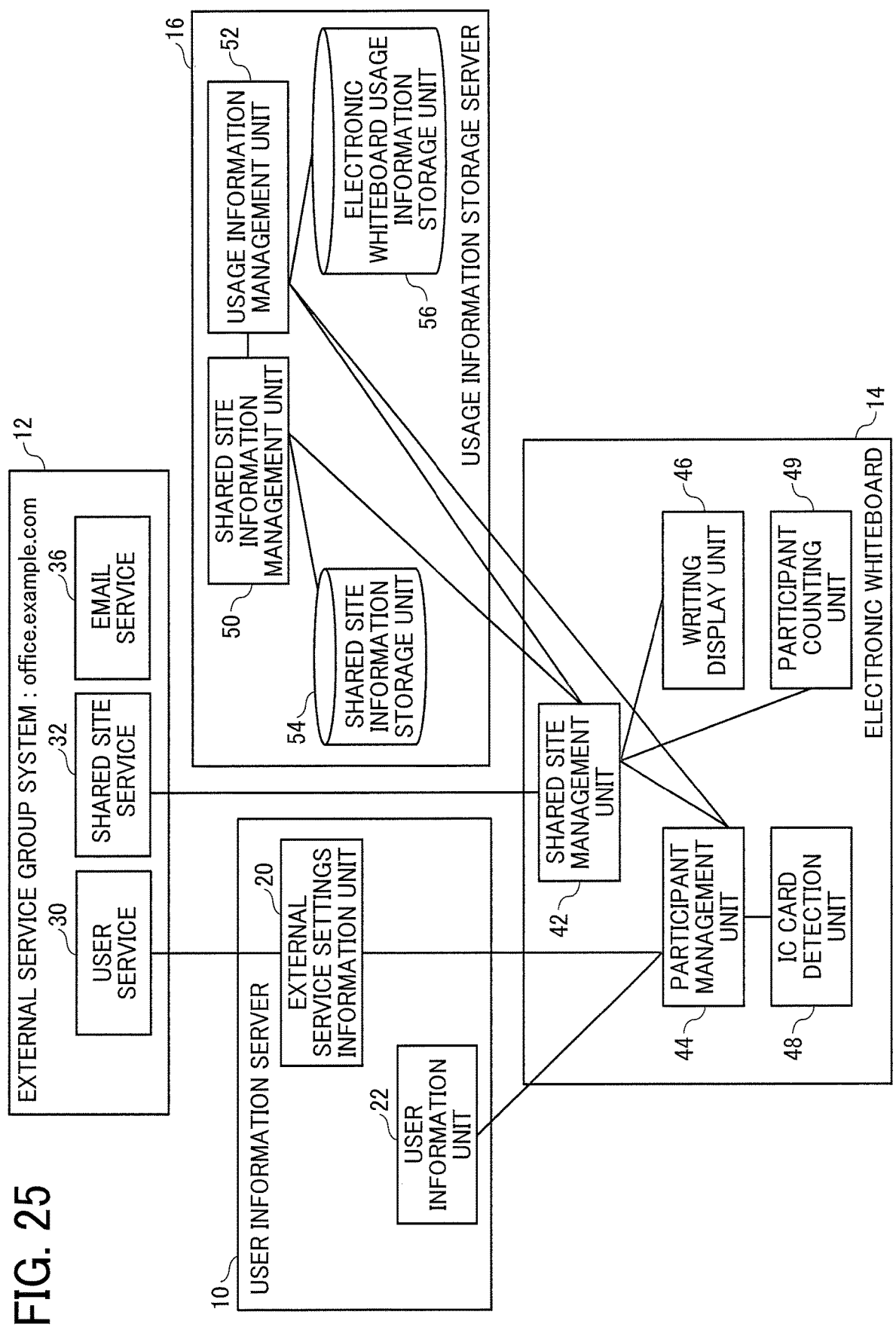
FIG. 25 is a diagram illustrating another example of the functional configuration of the information processing system according to embodiments of the present disclosure.

Further, the information processing system 1 may have a functional configuration as illustrated in FIG. 25, for example. FIG. 25 is a functional configuration diagram illustrating the information processing system 1 according to another embodiment of the present disclosure. The information processing system 1 illustrated in FIG. 25 includes a participant counting unit 49 in addition to the shared site management unit 42 and other elements of FIG. 4. The participant counting unit 49 counts the number of participants in the meeting room in an image of the meeting room captured by the camera 660. When the shared site management unit 42 determines that the number of participants added to the participant management information list of FIG. 8 is smaller than the number of participants in the meeting room counted by the participant counting unit 49, the shared site management unit 42 displays a participant suggestion screen 1050. When the shared site management unit 42 determines that the number of participants added to the participant management information list of FIG. 8 is the same or larger than the number of participants in the meeting room counted by the participant counting unit 49, the shared site management unit 42 does not display a participant suggestion screen 1050. The shared site management unit 42 may display the difference between the number of participants added to the participant management information list of FIG. 8 and the number of participants in the meeting room counted by the participant counting unit 49 (insufficient number of people) when displaying the participant suggestion screen 1050.

Figure 26:
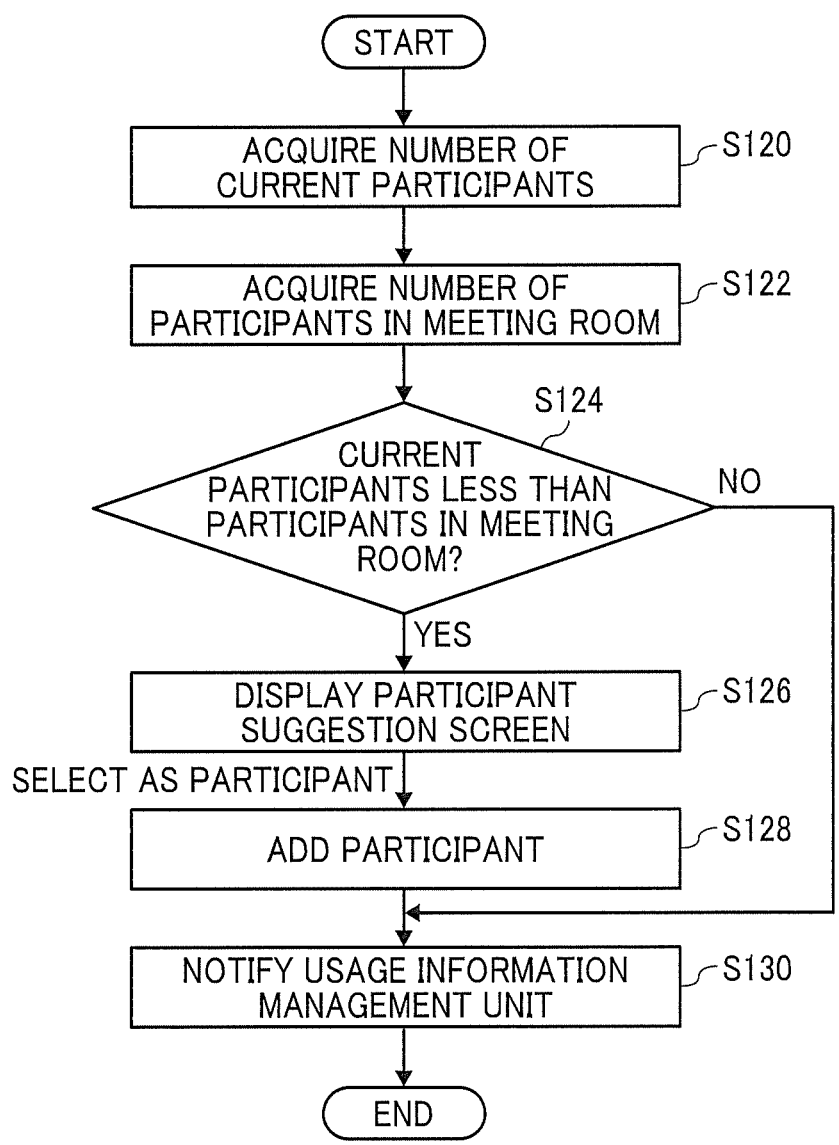
FIG. 26 is a flowchart illustrating another example of the participant suggestion process.
Figure 27:
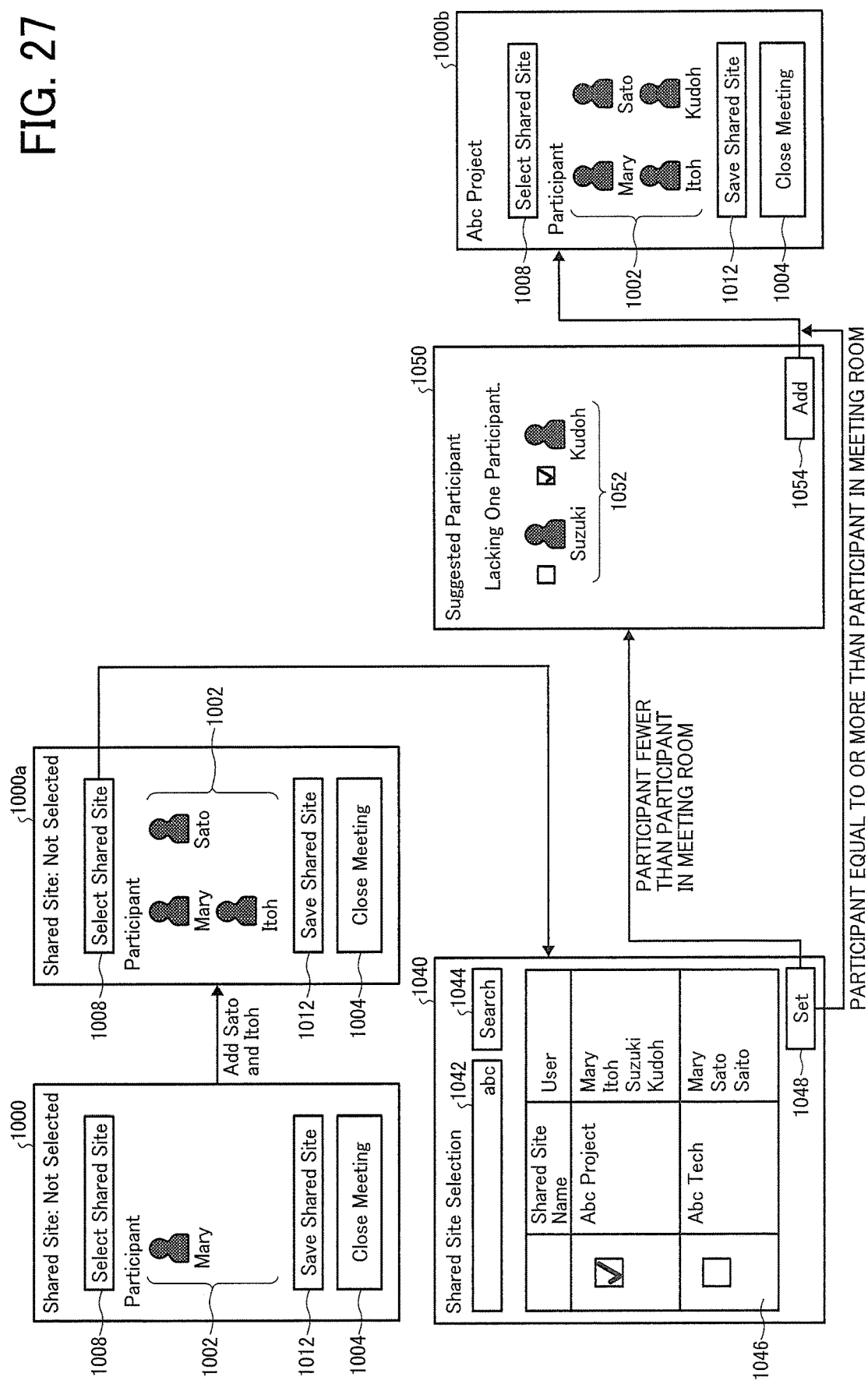
FIG. 27 is a diagram illustrating another example of the UI displayed on the electronic whiteboard.

In a case of the information processing system 1 of FIG. 25, for example, the process of suggesting participants illustrated in FIG. 18 performed by the information processing system 1 illustrated in FIG. 4 is replaced by the process of suggesting participants as illustrated in FIG. 26. FIG. 26 is a flowchart illustrating an example of a participant suggestion process. FIG. 27 is a diagram illustrating an example of a UI displayed on the electronic whiteboard.

In step S120, the electronic whiteboard 14 acquires the number of current participants from the participant management information list illustrated in FIG. 8. In step S122, the electronic whiteboard 14 acquires the number of participants in the meeting room counted by the participant counting unit 49. In step S124, the electronic whiteboard 14 determines whether the current number of participants is less than the number of participants in the meeting room counted by the participant counting unit 49.

If the current number of participants is less than the number of participants in the meeting room counted by the participant counting unit 49, the electronic whiteboard 14 displays the participant suggestion screen 1050 illustrated in FIG. 27 in step S126. On the participant suggestion screen 1050 of FIG. 27, a message indicating insufficient number of participant such as "lacking one participant" is additionally displayed on the participant suggestion screen 1050 of FIG. 19. Accordingly, the user can easily grasp the number of participants to be added on the participant suggestion screen 1050 of FIG. 27. The processing of steps S128 and S130 after step S126 are the same as steps S84 and S86 of FIG. 18.

If the current number of participants is equal to or more than the number of participants in the meeting room counted by the participant counting unit 49, the electronic whiteboard 14 determines that adding participants to the participant management information list is not necessary. In this case, the processing of steps S126 and S128 may be skipped and the participant suggestion screen 1050 of FIG. 27 may not be displayed.

With the configuration using the participant counting unit 49, the participant suggestion screen 1050 is displayed only when the participant management unit 44 recognizes a participant who is not in the meeting room and the participant suggestion screen 1050 is not displayed when all participants are recognized.

Basically, it is necessary to accept information such as ID and password from a user when the user is recognized by the electronic whiteboard 14 in a meeting in which a schedule is not registered in the schedule service (a sudden meeting), or in order to authenticate a user with the electronic whiteboard 14 when the user who is not included in the prospective participants in the schedule information registered in the schedule service.

Displaying the keyboard on the screen and accepting the input of the ID and the password is not preferable in terms of security, because the password may be seen by another user due to the nature of the electronic whiteboard 14 viewed by a plurality of users (meeting participants).

The ID and password may be received by holding the IC card 700 over the IC card reader 617, but not all participants may have the IC card 700, and it is necessary to store the ID and password in the IC card 700 in advance.

In the present embodiment, meeting participants do not require to carry another device such as the IC card 700 while ensuring security by recognizing the user using the user information stored on the server corresponding to the shared site service 32 which is a service external to the electronic whiteboard system.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. The information processing system 1 described in the above embodiments is just an example, and there may be various system configurations depending on applications or purposes.

Each function of the embodiments described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The apparatuses described in the examples are merely an illustration of one of several computing environments for implementing the embodiments disclosed herein.

In some embodiments, the user information server 10 and the usage information storage server 16 includes multiple computing devices, such as a server cluster. The plurality of computing devices are configured to communicate with one another through any type of communication link, including a network 18, shared memory, etc., and perform the processes disclosed herein. Similarly, the electronic whiteboard 14 may include multiple computing devices configured to communicate with one another.

Furthermore, the user information server 10, the electronic whiteboard 14, and the usage information storage server 16 may be configured to share the disclosed processing steps in various combinations. For example, a process executed by a particular unit may be executed by the electronic whiteboard 14. Similarly, the function of the particular unit may be executed by the electronic whiteboard 14. The components of the user information server 10, the usage information storage server 16, and the electronic whiteboard 14 may be combined into one server or may be divided into a plurality of apparatuses.

The electronic whiteboard 14 may be, for example, an output device such as a projector, a digital signage, a head up display device, an industrial machine, an imaging device, a sound collecting device, a medical device, a network home appliance, a car (connected car), a mobile phone, a game machine, a personal digital assistant (PDA), a digital camera, a wearable PC, or the like.

What is claimed is:

1. An information processing apparatus shared by a plurality of users, the information processing apparatus comprising:
   circuitry configured to:
   manage a detected user as a participant;
   accept selection of a shared site from the detected user;
   suggest one or more candidates of participant to be managed based on the selected shared site by displaying on a display a participant suggestion screen to allow the user to select the one or more candidates of participant as the participant to be managed;
   accept a participant selection operation by the user to select the participant; and
   add the selected participant as the participant to be managed.

2. The information processing apparatus of claim 1, wherein the circuitry is configured to identify the one or more candidates of participant for suggestion based on information associating the shared site selected by the information processing apparatus and the participant.

3. The information processing apparatus of claim 2, wherein the circuitry is configured to suggest one or more users of the shared site as the one or more candidates of participant based on information of the users of the shared site acquired from an external service by using external service settings information associated with the detected user.

4. The information processing apparatus of claim 2, wherein the circuitry is further configured to:
   compare a number of participants managed by the circuitry with a number of participants stored in association with the selected shared site; and
   suggest the one or more candidates of participant in a case that the number of the participants managed by the circuitry is smaller than the number of the participants stored in association with the selected shared site.

5. The information processing apparatus of claim 1, wherein the circuitry is further configured to exclude a participant already managed as the participant from the suggested candidates of participant displayed, on the participant suggestion screen.

6. The information processing apparatus of claim 1, wherein the circuitry is further configured to select all of the suggested candidates of participant as the participants managed by the circuitry.

7. The information processing apparatus of claim 1, wherein the circuitry is further configured to display on the display a shared site save screen to accept an operation by the user to save a file to the shared site and an operation by the user to transmit email to provide information for accessing the saved file.

8. The information processing apparatus of claim 7, wherein the circuitry is further configured to set the participant as a destination of the email.

9. The information processing apparatus of claim 7, wherein the circuitry is further configured to set at least one candidate of the one or more candidates of participant, not managed as the participant, as the destination of the email.

10. An information processing system comprising:
    an information processing apparatus shared by a plurality of users, the information processing apparatus comprising:
    circuitry configured to;
       manage a detected user as a participant;
       accept selection of a shared site from the detected user; and
       suggest one or more candidates of participant to be managed based on the selected shared site by displaying on a display a participant suggestion screen to allow the user to select the one or more candidates of participant as the participant to be managed;
       accept a participant selection operation by the user to select the participant; and
       add the selected participant as the participant to be managed;
    at least one memory configured to:
       store user information that associates the user with external service settings information and information on the shared site used by the information processing apparatus.

11. An information processing method executed by an information processing apparatus shared by a plurality of users, the method comprising:
    managing a detected user as a participant;
    accepting selection of a shared site from the detected user;
    suggesting one or more candidates of participant to be managed based on the selected shared site by displaying on a display a participant suggestion screen to allow the user to select the one or more candidates of participant as the participant to be managed;
    accepting a participant selection operation by the user to select the participant; and
    adding the selected participant as the participant to be managed.

* * * * *